United States Patent
Cui et al.

(10) Patent No.: US 11,006,291 B2
(45) Date of Patent: May 11, 2021

(54) DYNAMIC SELF-BACKHAUL RECONNECTION USING AN ENHANCED RADIO RESOURCE CONTROL MESSAGING FOR 5G AND OTHER NEXT GENERATION NETWORKS

(71) Applicant: AT&T Intellectual Property I, L.P., Atlanta, GA (US)

(72) Inventors: Zhi Cui, Sugar Hill, GA (US); Hongyan Lei, Plano, TX (US)

(73) Assignee: AT&T INTELLECTUAL PROPERTY I, L.P., Atlanta, GA (US)

(*) Notice: Subject to any disclaimer, the term of this patent is extended or adjusted under 35 U.S.C. 154(b) by 0 days.

(21) Appl. No.: 16/509,378

(22) Filed: Jul. 11, 2019

(65) Prior Publication Data
US 2021/0014706 A1    Jan. 14, 2021

(51) Int. Cl.
*H04L 12/26*    (2006.01)
*H04W 24/04*    (2009.01)
(Continued)

(52) U.S. Cl.
CPC ......... *H04W 24/04* (2013.01); *H04L 41/0668* (2013.01); *H04L 43/0817* (2013.01); *H04W 76/18* (2018.02)

(58) Field of Classification Search
CPC .. H04L 43/0817; H04W 24/04; H04W 76/18; H04W 72/1231; H04W 72/14; H04W 84/047; H04W 41/0668
See application file for complete search history.

(56) References Cited

U.S. PATENT DOCUMENTS

| 8,254,943 B1* | 8/2012 | Dinan | H04W 24/04 |
| | | | 455/450 |
| 2007/0110004 A1* | 5/2007 | Liu | H04W 72/0486 |
| | | | 370/335 |

(Continued)

OTHER PUBLICATIONS

Cui, et al. "Dynamic Self-Backhaul for Improved 5G Ran Reliability", U.S. Appl. No. 16/290,507, filed Mar. 1, 2019, 52 pages.

(Continued)

*Primary Examiner* — Minh Trang T Nguyen
(74) *Attorney, Agent, or Firm* — Amin, Turocy & Watson, LLP

(57) ABSTRACT

Various embodiments disclosed herein that facilitate a dynamic self-backhaul reconnection using a radio resource control messaging. According to some embodiments, a system can comprise detecting a failure in a first backhaul communication link with a first node device, wherein the first node device is communicatively connected to a core network device of a core network, selecting a second node device, other than the first node device, that is communicatively connected to the core network device for establishment of a second backhaul communication link to replace the first backhaul communication link, and facilitating establishing a first connection with the second node device to provide an indication of the failure of the first backhaul communication link, to provide a confirmation that the second node device is available in connection with establishment of the second backhaul communication link, and to request to reserve resources to establish the second backhaul communication link with the second node device.

20 Claims, 13 Drawing Sheets

(51) Int. Cl.
*H04W 76/18* (2018.01)
*H04L 12/24* (2006.01)

(56) References Cited

U.S. PATENT DOCUMENTS

| | | | | |
|---|---|---|---|---|
| 2011/0170471 A1* | 7/2011 | Dahlman | .......... | H04W 72/0446 |
| | | | | 370/312 |
| 2011/0222428 A1* | 9/2011 | Charbit | ................ | H04B 7/2606 |
| | | | | 370/252 |
| 2013/0003534 A1* | 1/2013 | Henry | ................... | H04W 40/00 |
| | | | | 370/228 |
| 2019/0069187 A1* | 2/2019 | Ashrafi | ................ | H04W 24/02 |
| 2019/0254037 A1* | 8/2019 | Gupta | ................ | H04W 72/042 |

OTHER PUBLICATIONS

3rd Generation Partnership Project; Technical Specification Group Radio Access Network; NR; Radio Resource Control (RRC) protocol specification (Release 15): 3GPP, 3GPP TS 38.331 V15.5.0 (Mar. 2019), 491 pages.

"3rd Generation Partnership Project; Technical Specification Group Radio Access Network; NR; Study on Integrated Access and Backhaul; (Release 16)" 3GPP, 3GPP TR 38.874 V16.0.0 (Dec. 2018), 111 pages.

* cited by examiner

DYNAMIC SELF-BACKHAUL RECONNECTION USING AN ENHANCED RADIO RESOURCE CONTROL MESSAGING FOR 5G AND OTHER NEXT GENERATION NETWORKS

TECHNICAL FIELD

This disclosure relates generally to a self-backhaul network architecture for a 5G new radio (NR) network, e.g., facilitation of a dynamic self-backhaul reconnection using radio resource control messaging.

BACKGROUND

5th generation (5G) wireless systems represent a next major phase of mobile telecommunications standards beyond the current telecommunications standards of $4^{th}$ generation (4G). In addition to faster peak Internet connection speeds, 5G planning aims at higher capacity than current 4G, allowing a higher number of mobile broadband users per area unit, and allowing consumption of higher or unlimited data quantities. This would enable a large portion of the population to stream high-definition media many hours per day with their mobile devices, when out of reach of wireless fidelity hotspots. 5G research and development also aims at improved support of machine-to-machine communication, also known as the Internet of things, aiming at lower cost, lower battery consumption, and lower latency than 4G equipment. 5G needs to support various applications including enhanced mobile broadband (eMBB), mission critical, and ultra-reliability and low latency (URLLC) applications is a key feature of the 5G network. High level of densification of small cells with millimeter wave (mmW) Transmit and Receive Point (TRP) and the self-backhaul capability are the technology advances of 5G to meet the bandwidth demand. To achieve high reliable 5G network, improving the transport availability of the mmW TRPs is critical.

The above-described background relating to facilitating a self-backhaul communication system, is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
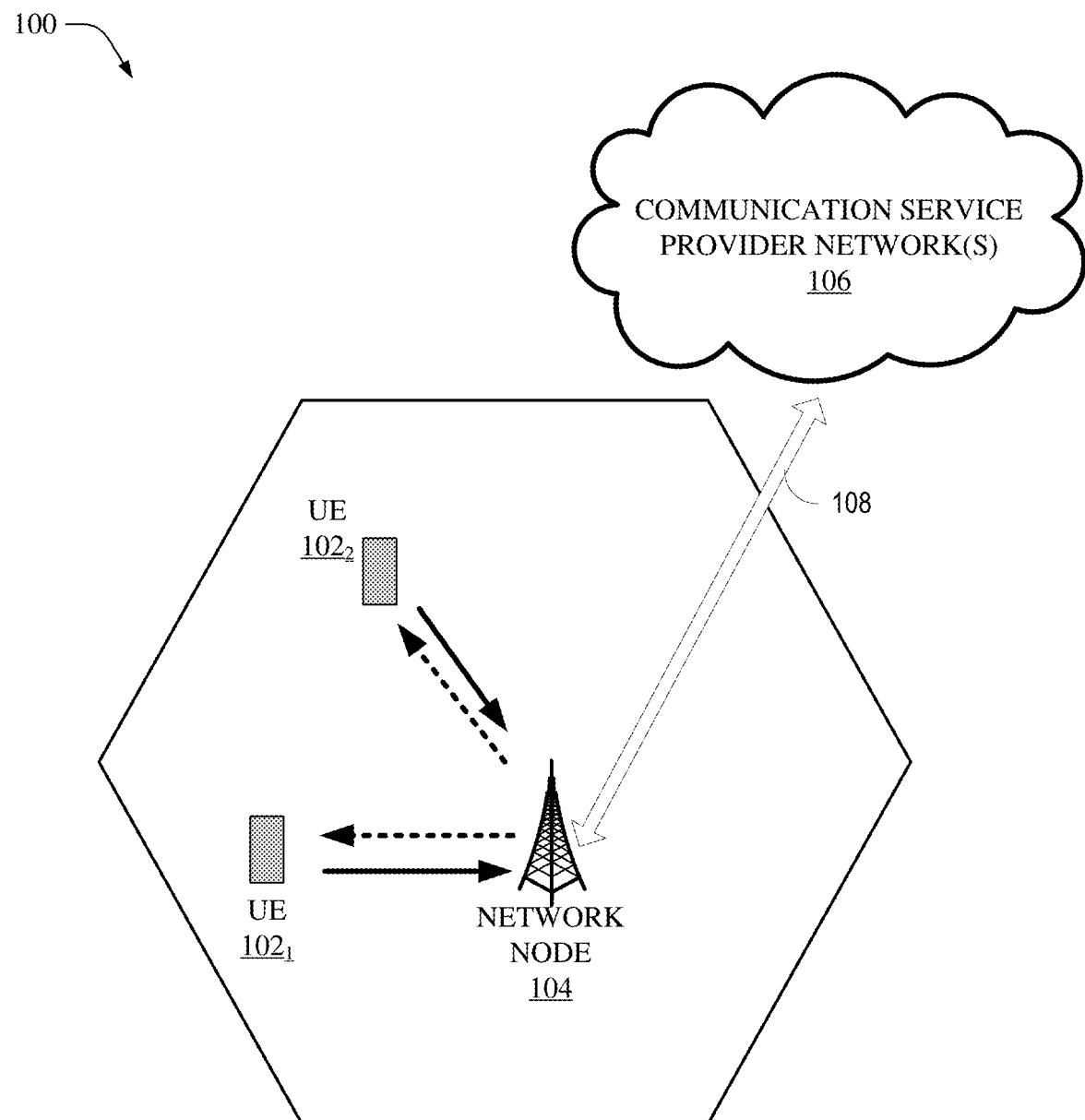
FIG. 1 illustrates an example wireless communication system in which a network node device (e.g., network node) and user equipment (UE) can implement various aspects and embodiments of the subject disclosure.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, or machine-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to facilitate a self-backhaul communication system that dynamically reconfigures 5G self-backhaul when a connection fails. For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term article of manufacture, as used herein, is intended to encompass a computer program accessible from any computer-readable device, carrier, or media, including a non-transitory machine-readable storage medium.

It should be noted that although various aspects and embodiments have been described herein in the context of 5G, Universal Mobile Telecommunications System (UMTS), and/or Long-Term Evolution (LTE), or other next generation networks, the disclosed aspects are not limited to 5G, a UMTS implementation, and/or an LTE implementation as the techniques can also be applied in 3G, 4G or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

Described herein are systems, methods, articles of manufacture, and other embodiments or implementations that can facilitate dynamic reconfiguration of 5G backhaul connection upon detecting a connection failure. Facilitating dynamic reconfiguration of 5G backhaul connection can be implemented in connection with any type of device with a connection to the communications network (e.g., a mobile handset, a computer, a handheld device, etc.) any Internet of things (JOT) device (e.g., toaster, coffee maker, blinds, music players, speakers, etc.), and/or any connected vehicles (cars, airplanes, space rockets, and/or other at least partially automated vehicles (e.g., drones)). In some embodiments the non-limiting term user equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles, etc. Note that the terms element, elements and antenna ports can be interchangeably used but carry the same meaning in this disclosure. The embodiments are applicable to single carrier as well as to multicarrier (MC) or carrier aggregation (CA) operation of the UE. The term carrier aggregation (CA) is also called (e.g., interchangeably called) "multi-carrier system", "multi-cell operation", "multi-carrier operation", "multi-carrier" transmission and/or reception.

In some embodiments the non-limiting term radio, network node, or simply network node is used. It can refer to any type of network node that serves UE is connected to other network nodes or network elements or any radio node from where UE receives a signal. Examples of radio network nodes are Node B, base station (BS), multi-standard radio (MSR) node such as MSR BS, eNode B, network controller, radio network controller (RNC), base station controller (BSC), relay, donor node controlling relay, base transceiver station (BTS), access point (AP), transmission points, transmission nodes, remote radio unit (RRU), remote radio head (RRH), nodes in distributed antenna system (DAS), relay device, network node, node device, etc.

Cloud radio access networks (RAN) can enable the implementation of concepts such as software-defined network (SDN) and network function virtualization (NFV) in 5G networks. This disclosure can facilitate a generic channel state information framework design for a 5G network. Certain embodiments of this disclosure can comprise an SDN controller that can control routing of traffic within the network and between the network and traffic destinations. The SDN controller can be merged with the 5G network architecture to enable service deliveries via open application programming interfaces ("APIs") and move the network core towards an all internet protocol ("IP"), cloud based, and software driven telecommunications network. The SDN controller can work with or take the place of policy and charging rules function ("PCRF") network elements so that policies such as quality of service and traffic management and routing can be synchronized and managed end to end.

To meet the huge demand for data centric applications, 4G standards can be applied 5G, also called new radio (NR) access. 5G networks can comprise the following: data rates of several tens of megabits per second supported for tens of thousands of users; 1 gigabit per second can be offered simultaneously to tens of workers on the same office floor; several hundreds of thousands of simultaneous connections can be supported for massive sensor deployments; spectral efficiency can be enhanced compared to 4G; improved coverage; enhanced signaling efficiency; and reduced latency compared to LTE. In multicarrier system such as OFDM, each subcarrier can occupy bandwidth (e.g., subcarrier spacing). If the carriers use the same bandwidth spacing, then it can be considered a single numerology. However, if the carriers occupy different bandwidth and/or spacing, then it can be considered a multiple numerology.

In some embodiments, a 5G mobile network comprises interconnected small cells (also referred to as "relay node devices" or "network node devices") forming a small cell backhaul network (e.g., self-backhaul). The small cell can be a network device operating utilizing millimeter wave (mmW) spectrum (e.g., higher frequencies, 30 gigahertz (GHz)-300 GHz) and comprises transmitter and receiver that are equipped with multiple antennas for wired and/or wireless communication. The 5G mobile networks can be deployed using wired (e.g., fiber backhaul) and wireless (e.g., self-backhaul) technology to connect small cells to a macro cell, wherein the macro cell is communicatively connected to the core network. For example, several small cells operating in multiple bands can be connected to a macro cell, wherein 5G mobile networks support various applications. Ultra-reliability and low latency are key features of the 5G network. High level of densification of small cells with mmW TRP and self-backhaul capability are the technology advances of 5G to meet the bandwidth demand.

In one embodiment, internet protocol tunnel between the cells and core network is created to support the various application and high bandwidth demands, wherein the individual connection is monitored by the small cells. The internet protocol tunnel can be used for transmission of data directed to user equipment devices from the core network and transmission of data from user equipment via the small cell network to the core network. As 5G needs to support various applications including enhanced mobile broadband eMBB, mission critical, and URLLC application, maintaining the connection is crucial. Due to various factors, such as weather, network traffic, or physical break in wired connection (e.g., fiber cable accidently cut or damaged), the connection between the small cells and core network can fail (e.g., failure of self-backhaul connection) anytime. Disclosed herein are solutions that enable dynamic reconnection of 5G mmW TRP self-backhaul connection when the backhaul connection or the existing mmW self-backhaul connection (e.g., backhaul connection between other mmW TRPs or small cells) to network fails. The advantage of the described solution is that it enables dynamic and automatic connection (e.g., reestablishment) of self-backhaul to improve the reliability of the 5G mobile network.

In some embodiments, a relay device can comprise a processor and a memory that stores executable instructions that, when executed by the processor, facilitate performance of operations comprising detecting a failure of a backhaul communication link. The relay device scans for best suitable cell (e.g., a cell with strongest radio frequency (RF) signal) to establish a connection. If the failed connection was a fiber backhaul connection (e.g., failed wired connection between the relay device and the macro cell), then the relay device can attempt to reestablish connection with macro cell using a wireless connection. In some embodiments, based on network conditions, the relay device can initiate a wireless connection directly with the macro cell or initiate a connection via another relay device that is communicatively connected to the core network. The relay device transmits signal to the macro cell, wherein the signal comprises a message indicating connection failure and request for new resources to establish a new connection. In some embodiments, minimum bandwidth (e.g., sufficient to carry 8 bits of information) is employed to transmit the signal to the macro cell. The macro cell thereafter relays the message to a controller (e.g., SDN controller) that maintains a graph of the network. The controller determines the resources required based on network conditions and data analytics and provides resource setup information to the relay device via the macro cell. The relay device can initiate establishment of the connection using the resource setup information. The relay device can transmit an acknowledgement of the new connection to the controller via the macro cell. The controller can update the network graph in response to receiving the acknowledgement.

In some embodiments, a relay device can comprise a processor and a memory that stores executable instructions that, when executed by the processor, facilitate performance of operations comprising detecting a failure of a backhaul communication link. The relay device scans for best suitable node (e.g., a node with strongest RF signal) to establish a connection. The relay device selects a new node (e.g., another relay device or a macro cell) to establish a backhaul connection. In some embodiments, the selection of the new node is based on RF signal strength and/or location (e.g., geographically closest to the relay node). In some embodiments, the node with strongest RF signal strength is selected. In some embodiments, the relay device transmits a signal directly to a macro cell or via the selected node, wherein the signal comprises a message indicating connection failure and request for new resources to establish a new connection. In some embodiments, minimum bandwidth (e.g., sufficient to carry 8 bits of information) is employed to transmit the signal to the macro cell. The macro cell or the selected node thereafter relays the message to a controller (e.g., SDN controller) that maintains a graph of the network. The controller determines the resources required based on network conditions and data analytics and provides resource setup information to the relay device via the macro cell. The relay device can initiate establishment of the connection using the resource setup information received from the controller. The relay device can transmit an acknowledgement of the new connection to the controller via the macro cell or the selected. The controller can update the network graph in response to receiving the acknowledgement.

According an embodiment, a system can comprise a processor and a memory that stores executable instructions that, when executed by the processor, facilitate performance of operations comprising detecting a failure in a first backhaul communication link with a first node device, wherein the first node device is communicatively connected to a core network device of a core network. The system can further facilitate selecting a second node device (e.g., a donor node that can serve to replace the failed backhaul communication link), other than the first node device, that is communicatively connected to the core network device for establishment of a second backhaul communication link to replace the first backhaul communication link. The system can further facilitate establishing a first connection with the second node device to provide an indication of the failure of the first backhaul communication link, to provide a confirmation that the second node device is available in connection with establishment of the second backhaul communication link, and to request to reserve resources to establish the second backhaul communication link with the second node device.

According to another embodiment, described herein is a method that can comprise detecting, by a device comprising a processor, a failure in a first backhaul communication link with a connected node device, wherein the connected node device is communicatively connected to a core network device of a core network. The method can further comprise selecting, by the device, a second node device, other than the connected node device, that is communicatively connected to the core network device for establishment of a second backhaul communication link to replace the first backhaul communication link. The method can further comprise facilitating, by the device, establishing a connection with the second node device to provide an indication of the failure of the first backhaul communication link, to provide a confirmation that the second node device is available to establish the second backhaul communication link, and to request resources to establish the second backhaul communication link with the second node device.

According to yet another embodiment, a machine-readable storage medium (e.g., a device), comprising executable instructions that, when executed by a processor, facilitate performance of operations, comprising detecting a failure in a first backhaul communication link with a connected node device, wherein the connected node device is communicatively connected to a core network device of a core network. The device can further comprise selecting a donor node device, other than the connected node device, that is communicatively connected to the core network device for establishment of a second backhaul communication link to replace the first backhaul communication link. The device can further comprise facilitating establishing a connection with the donor node device to provide an indication of the failure of the first backhaul communication link, to provide a confirmation that the donor node device is available to establish the second backhaul communication link, and to request resources to establish the second backhaul communication link with the donor node device.

These and other embodiments or implementations are described in more detail below with reference to the drawings. Repetitive description of like elements employed in the figures and other embodiments described herein is omitted for sake of brevity.

FIG. 1 illustrates a non-limiting example of a wireless communication system 100 in accordance with various aspects and embodiments of the subject disclosure. In one or more embodiments, system 100 can comprise one or more user equipment UEs 102. The non-limiting term user equipment can refer to any type of device that can communicate with a network node in a cellular or mobile communication system. A UE can have one or more antenna panels having vertical and horizontal elements. Examples of a UE comprise a target device, device to device (D2D) UE, machine type UE or UE capable of machine to machine (M2M) communications, personal digital assistant (PDA), tablet, mobile terminals, smart phone, laptop mounted equipment (LME), universal serial bus (USB) dongles enabled for mobile communications, a computer having mobile capabilities, a mobile device such as cellular phone, a laptop having laptop embedded equipment (LEE, such as a mobile broadband adapter), a tablet computer having a mobile broadband adapter, a wearable device, a virtual reality (VR) device, a heads-up display (HUD) device, a smart car, a machine-type communication (MTC) device, and the like. User equipment UE 102 can also comprise IOT devices that communicate wirelessly.

In various embodiments, system 100 is or comprises a wireless communication network serviced by one or more wireless communication network providers. In example embodiments, a UE 102 can be communicatively coupled to the wireless communication network via a network node 104. The network node (e.g., network node device) can communicate with user equipment (UE), thus providing connectivity between the UE and the wider cellular network. The UE 102 can send transmission type recommendation data to the network node 104. The transmission type recommendation data can comprise a recommendation to transmit data via a closed loop MIMO mode and/or a rank-1 precoder mode.

A network node can have a cabinet and other protected enclosures, an antenna mast, and multiple antennas for performing various transmission operations (e.g., MIMO operations). Network nodes can serve several cells, also called sectors, depending on the configuration and type of antenna. In example embodiments, the UE 102 can send and/or receive communication data via a wireless link to the network node 104. The dashed arrow lines from the network node 104 to the UE 102 represent downlink (DL) communications and the solid arrow lines from the UE 102 to the network nodes 104 represents an uplink (UL) communication.

System 100 can further include one or more communication service provider networks 106 that facilitate providing wireless communication services to various UEs, including UE 102, via the network node 104 and/or various additional network devices (not shown) included in the one or more communication service provider networks 106. The one or more communication service provider networks 106 can include various types of disparate networks, including but not limited to: cellular networks, femto networks, picocell networks, microcell networks, internet protocol (IP) networks Wi-Fi service networks, broadband service network, enterprise networks, cloud based networks, millimeter wave networks and the like. For example, in at least one implementation, system 100 can be or include a large scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.). The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

Wireless communication system 100 can employ various cellular systems, technologies, and modulation modes to facilitate wireless radio communications between devices (e.g., the UE 102 and the network node 104). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc.

For example, system 100 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of proposed 5G networks may comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks may allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The upcoming 5G access network may utilize higher frequencies (e.g., >6 GHz) to aid in increasing capacity. Currently, much of the millimeter wave (mmWave) spectrum, the band of spectrum between 30 GHz and 300 GHz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications, and has been widely recognized a potentially important component for access networks operating in higher frequencies. MIMO can be used for achieving diversity gain, spatial multiplexing gain and beamforming gain. For these reasons, MIMO systems are an important part of the 3rd and 4th generation wireless systems, and are planned for use in 5G systems.

Figure 2:
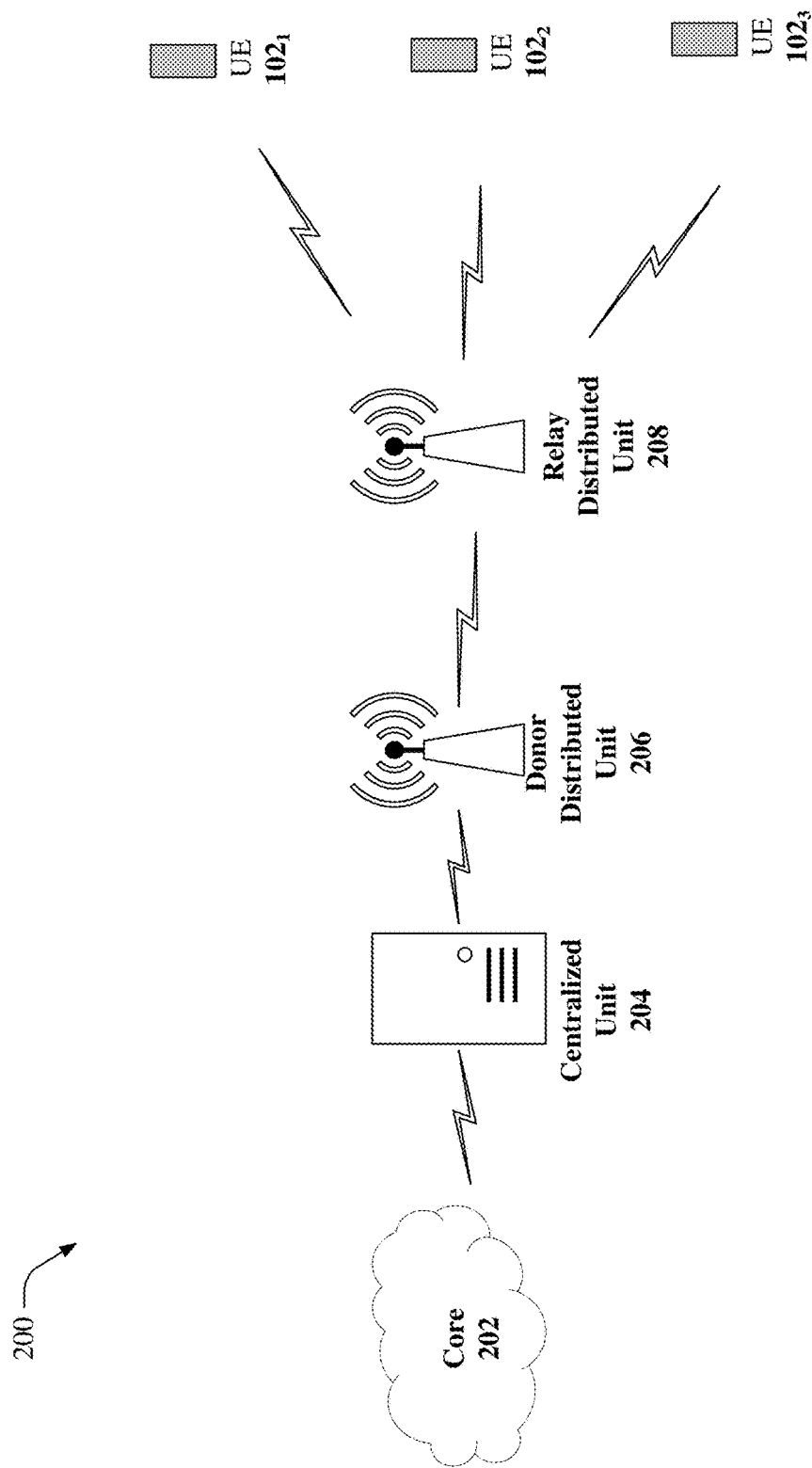
FIG. 2 illustrates an example schematic system block diagram of integrated access and backhaul links according to one or more embodiments.

Referring now to FIG. 2, illustrated is an example schematic system block diagram of integrated access and backhaul links according to one or more embodiments. For example, the network 200, as represented in FIG. 2 with integrated access and backhaul links, can allow a relay node to multiplex access and backhaul links in time, frequency, and/or space (e.g. beam-based operation). Thus, FIG. 2 illustrates a generic IAB set-up comprising a core network 202, a centralized unit 204, a donor distributed unit 206, a relay distributed unit 208, and UEs $102_1$, $102_2$, $102_3$. The donor distributed unit 206 (e.g., access point) can have a wired backhaul with a protocol stack and can relay the user traffic for the UEs $102_1$, $102_2$, $102_3$ across the IAB and backhaul link. Then the relay distributed unit 208 can take the backhaul link and convert it into different strains for the connected UEs $102_1$, $102_2$, $102_3$. Although FIG. 2 depicts a single hop (e.g., over the air), it should be noted that multiple backhaul hops can occur in other embodiments.

The relays can have the same type of distributed unit structure that the gNode B has. For 5G, the protocol stack can be split, where some of the stack is centralized. For example, the PDCP layer and above can be at the centralized unit 204, but in a real time application part of the protocol stack, the radio link control (RLC), the medium access control (MAC), and the physical layer PHY can be co-located with the base station wherein the system can comprise an F1 interface. In order to add relaying, the F1 interface can be wireless so that the same structure of the donor distributed unit 206 can be kept.

Figure 3:
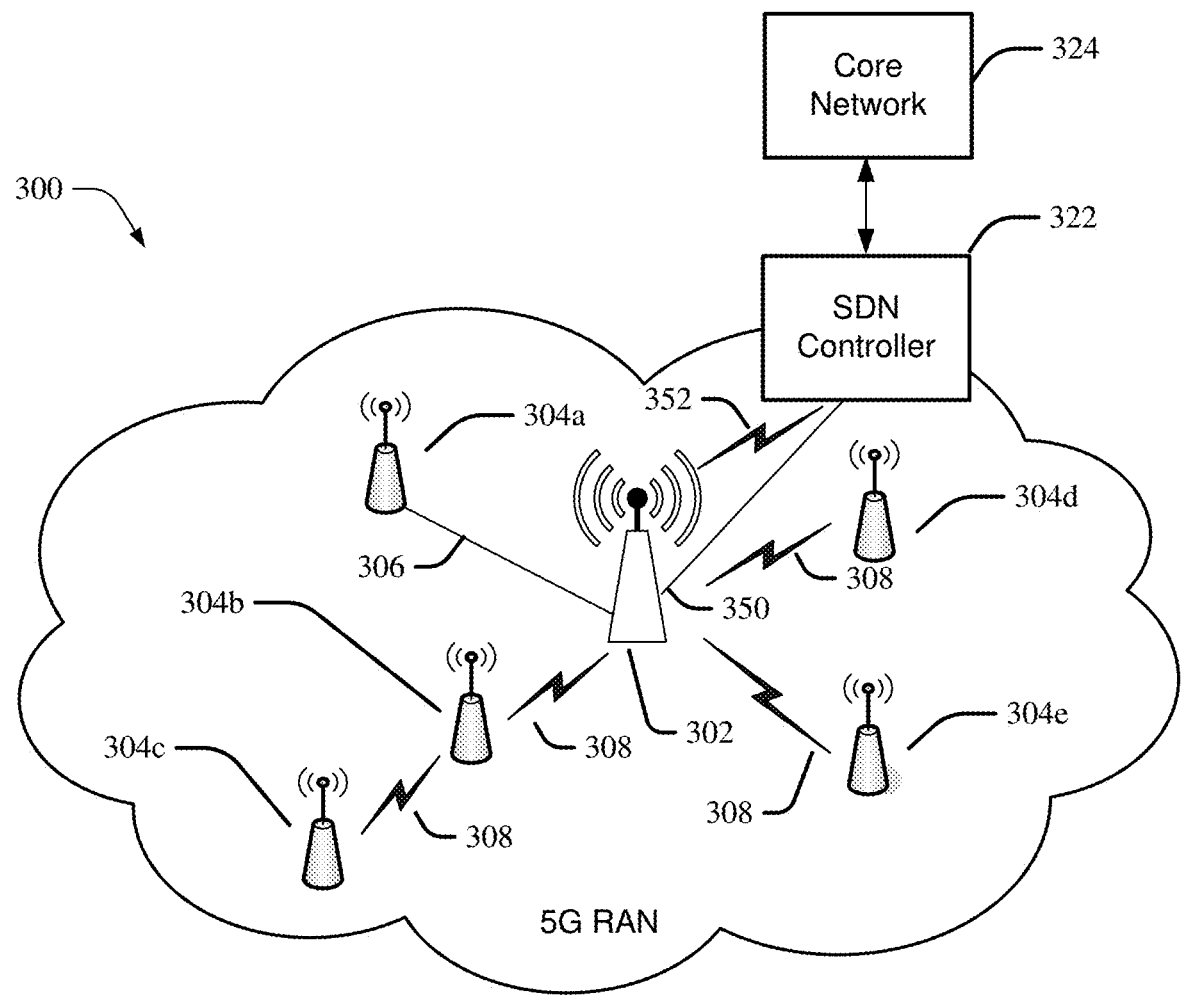
FIG. 3 illustrates an example small cell network according to one or more embodiments.

Referring now to FIG. 3, illustrated is an example a small cell (e.g., mmW TRP, a relay device or a node node) network 300 in accordance with various aspects and embodiments described herein. In some embodiments, the small cell network 300 can comprise one or more small cells 304*a-e* (referred herein as "small cells 304") that are communicatively connected to a macro cell 302. The small cells 304 can be connected to the macro cell 302 via a wire connection (e.g., fiber backhaul connections) 306 and/or can be connected via a wireless connection (e.g., self-backhaul connection) 308. The macro cell 302 can be communicatively connected to an SDN controller 322 via wire connection 350 or wireless connection 352. The self-backhaul connection 308 can operate using a single band selected from multiple band. For example, but not limited to, mmW bands and Sub 6 GHz bands. The fiber backhaul connection 306 and self-backhaul connection 308 enable transportation of data between small cells and the core network 324.

Figure 4A:
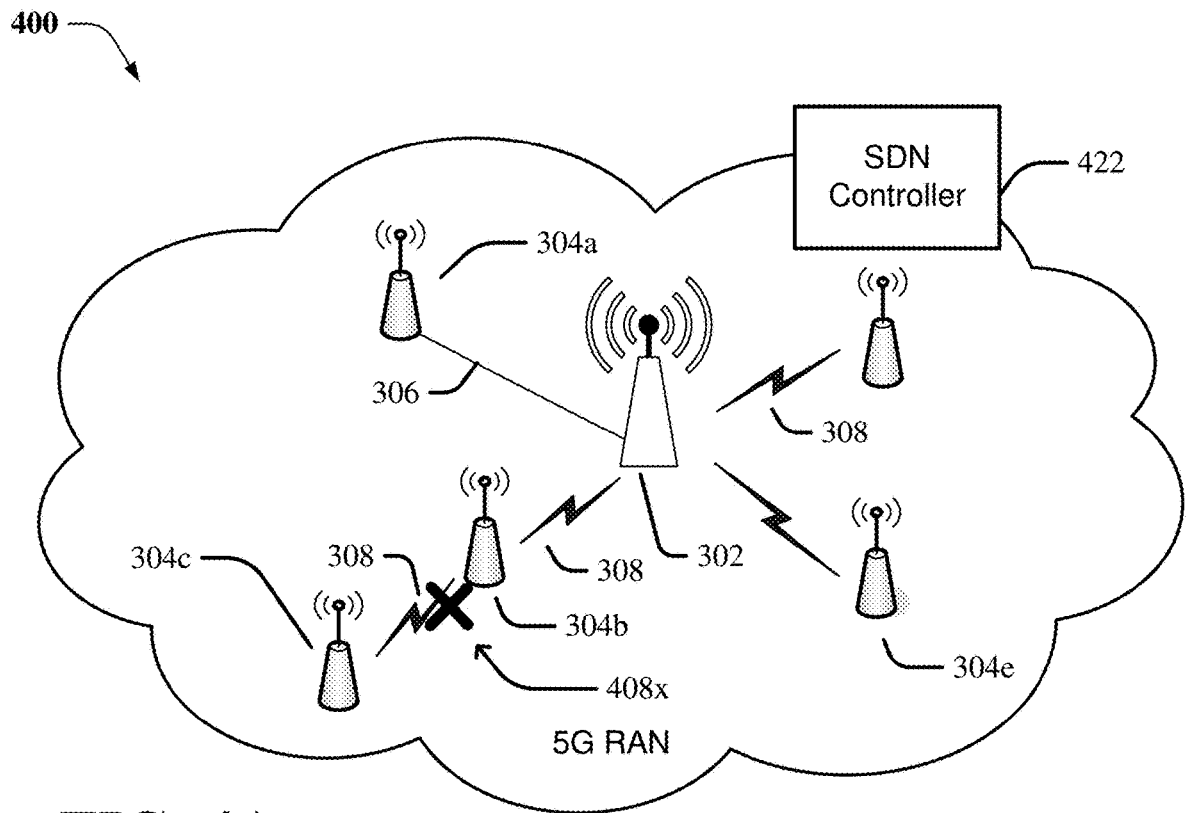
FIG. 4A-4B illustrates an example small cell network according to one or more embodiments.

Referring now to FIG. 4A, illustrated is an example a small cell network 400 having a failed wireless connection in accordance with various aspects and embodiments described herein. In some embodiment, as illustrated, a connection failure 408*x* has occurred at wireless connection 308 between small cell 304*c* and macro cell 302. In response to detecting the connection failure 408*x*, the small cell 304*c* can scan nearby cells (e.g., macro cell or other small cells) to reestablish the connection. In some embodiments, the small cell 304*c* can ping the macro cell 302, small cell 304*b* and small cell 304*e* to select the new cell based on, but not limited to, RF signal strength and network conditions. In some embodiments, the small cell 304*c* can confirm that the small cell 304*e* is available for establishing a backhaul connection.

Figure 4B:
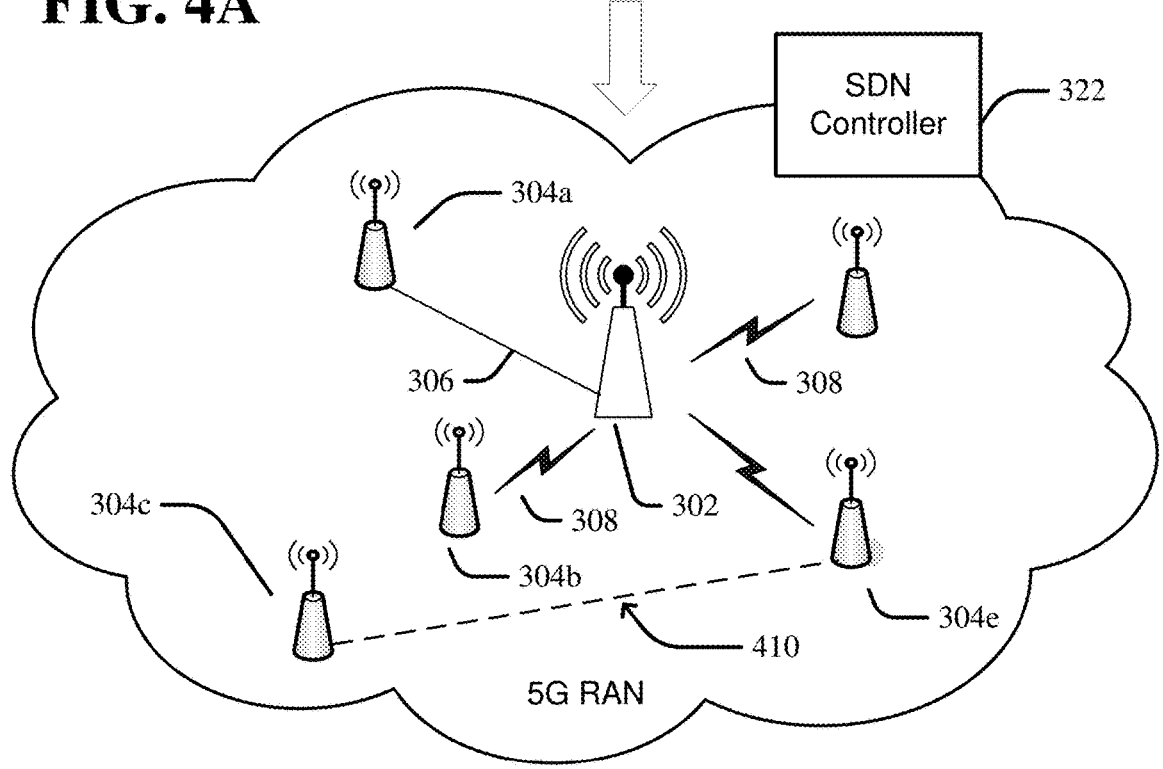

Referring now to FIG. 4B, illustrated is an example a small cell network 400 after having a new connection in accordance with various aspects and embodiments described herein. In some embodiment, upon the small 304*c* scans for nearby small cells (e.g., 304*a* or 304*e*) with the RF signal strength above a threshold. The 304*c* selects the best (e.g., RF signal strength above a threshold, low traffic, location) small cell, for example, small cell 304*e*. According to some embodiments, the 304*c* establishes a connection with small cell 304*e* and confirms that the small cell 304*e* is available for establishing a backhaul connection. In response to confirmation of availability, the small cell 304*c* transmits an enhanced radio resource control message to the small cell 304*e* to request resources from SDN controller 322. As illustrated, upon selecting a new cell, for example small cell 304*e*, a new connection 410 is established. As discussed below, the small cell can transmit a signal using minimum bandwidth to notify the SDN controller 322, via the macro cell 302 or small cell 304*e*, that a connection failure has occurred, and new resources are needed to establish a new connection between small cell 304*c* and small cell 304*e* (e.g., a new relay device) is available for establishing a new backhaul connection. In some embodiments, the small cell 304*c* can send a signal to SDN controller 322 via macro cell 302 that is communicatively connected to the SDN controller 322. In some embodiments, the new connection 410 is a wireless connection between small cell 304*c* and small cell 304*e*. In some embodiments, the small cell 304*c* can establish a connection to small cell 304*a*, wherein the communication to macro cell can be both a wireless connection 412 and wired connection 306 (e.g., fiber backhaul connection). In some embodiments, the SDN controller 322 can update the network graph indicating the new connection (e.g., connection 410 or connection 412) upon receiving confirmation from the small cell 304*c*.

Figure 5A:
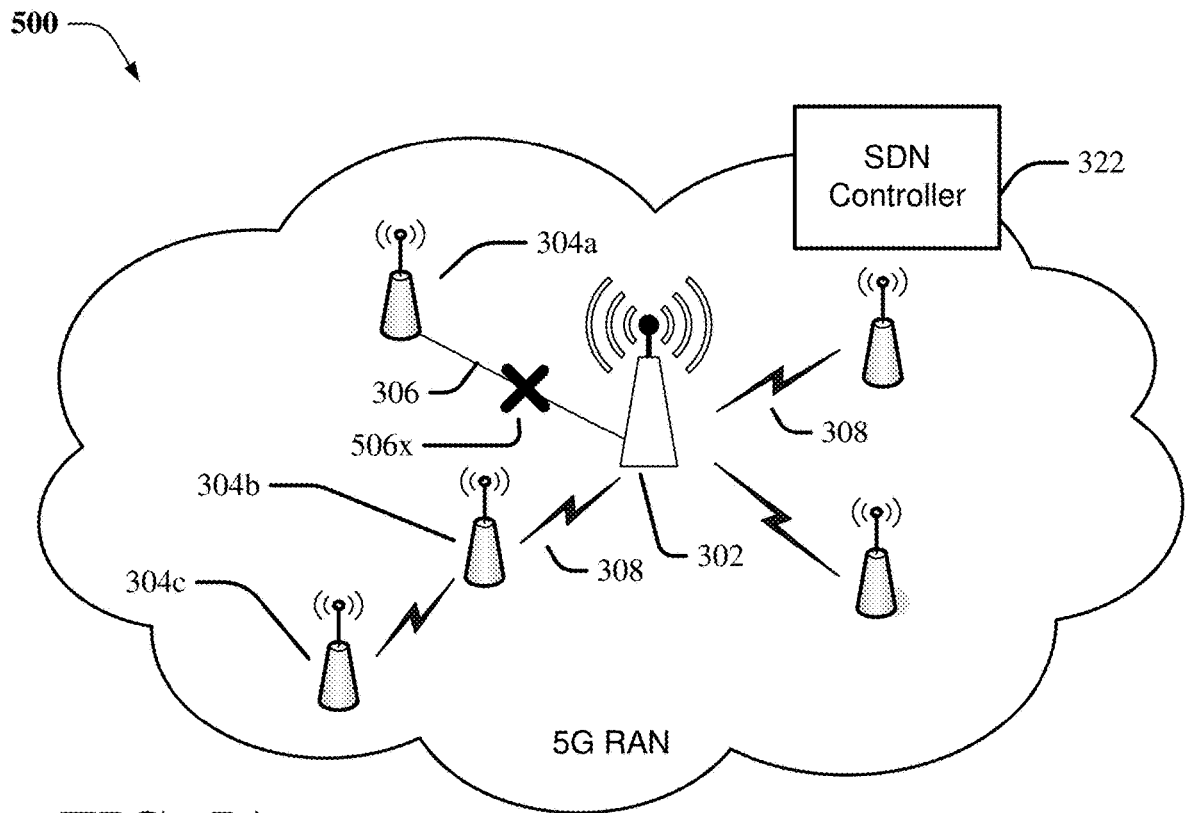
FIG. 5A-5B illustrates an example small cell network according to one or more embodiments.

Referring now to FIG. 5A, illustrated is an example a small cell network 500 having a failed wired (e.g., fiber backhaul) connection in accordance with various aspects and embodiments described herein. In some embodiment, as illustrated, a connection failure 506*x* has occurred at fiber backhaul connection 306 between small cell 304*a* and macro cell 302. In response to detecting the connection failure 506*x*, the small cell 304*a* can scan nearby cells (e.g., macro cell or other small cells) to reestablish the connection. In some embodiments, the small cell 304*a* can tune to and ping the macro cell 302, the small cell 304*b* or the small cell 304*c* to select the new cell based on, but not limited to, RF signal strength and network conditions. In some embodiments, the small cell 304a can confirm that the small cell 304b is available for establishing a backhaul connection.

Figure 5B:
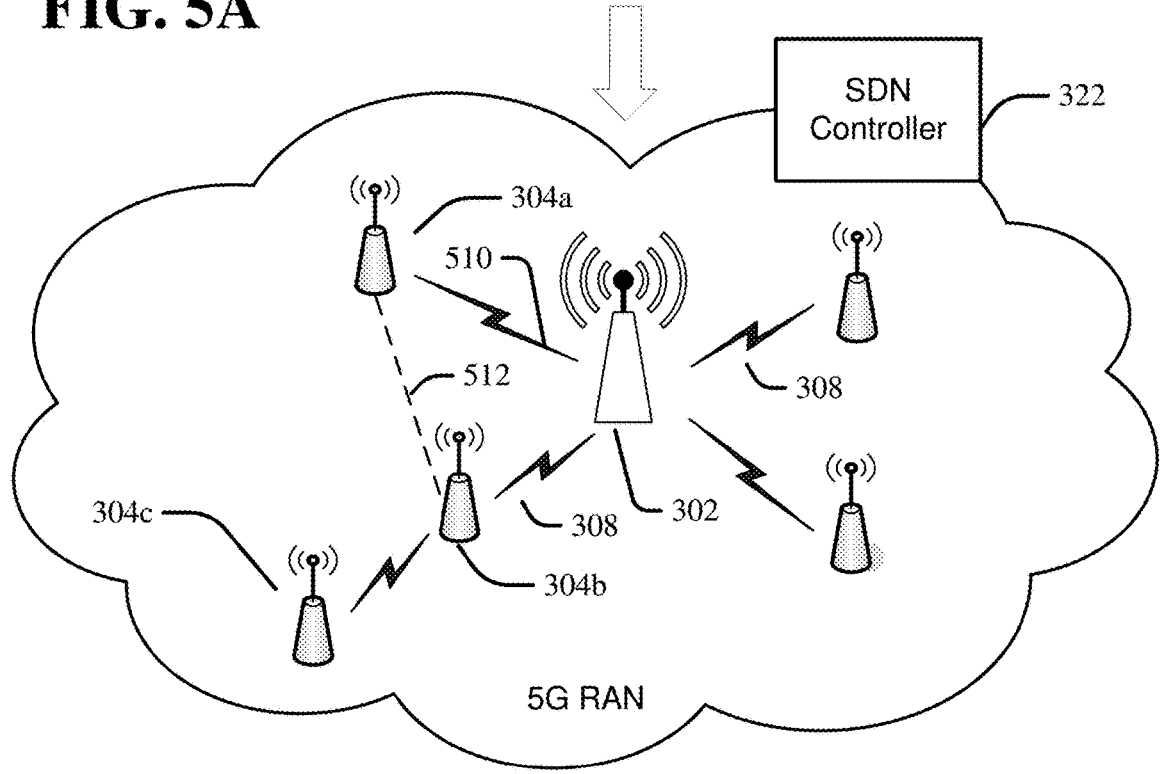

Referring now to FIG. 5B, illustrated is an example a small cell network 500 after having a new connection in accordance with various aspects and embodiments described herein. In some embodiment, as illustrated, upon selecting a new cell, for example macro cell 302, a new connection 510 is established. As discussed below (FIG. 6), the small cell can transmit a signal using minimum bandwidth to notify the SDN controller 322, via the macro cell 302, that a connection failure has occurred, and new resources are needed to establish connection. In some embodiments, wireless resources are requested for establishing a connection 510 between the small cell 304a and the macro cell 302. In some embodiments, wireless resources are requested for establishing a new connection 512 between the small cell 304a and the small cell 304b upon confirming that the small cell 304b is available to establish a backhaul connection. In some embodiments, the small cell 304a can utilize an enhanced RRC message to send the signal to SDN controller 322 via small cell 304b, as well as the macro cell 302, that are communicatively connected to the SDN controller 322. In some embodiments, the new connection 510 is a wireless connection between small cell 304a and the macro cell 302. In some embodiments, the SDN controller 322 can update the network graph indicating the connection 510 (or connection 512) upon receiving confirmation from the small cell 304a.

Figure 6:
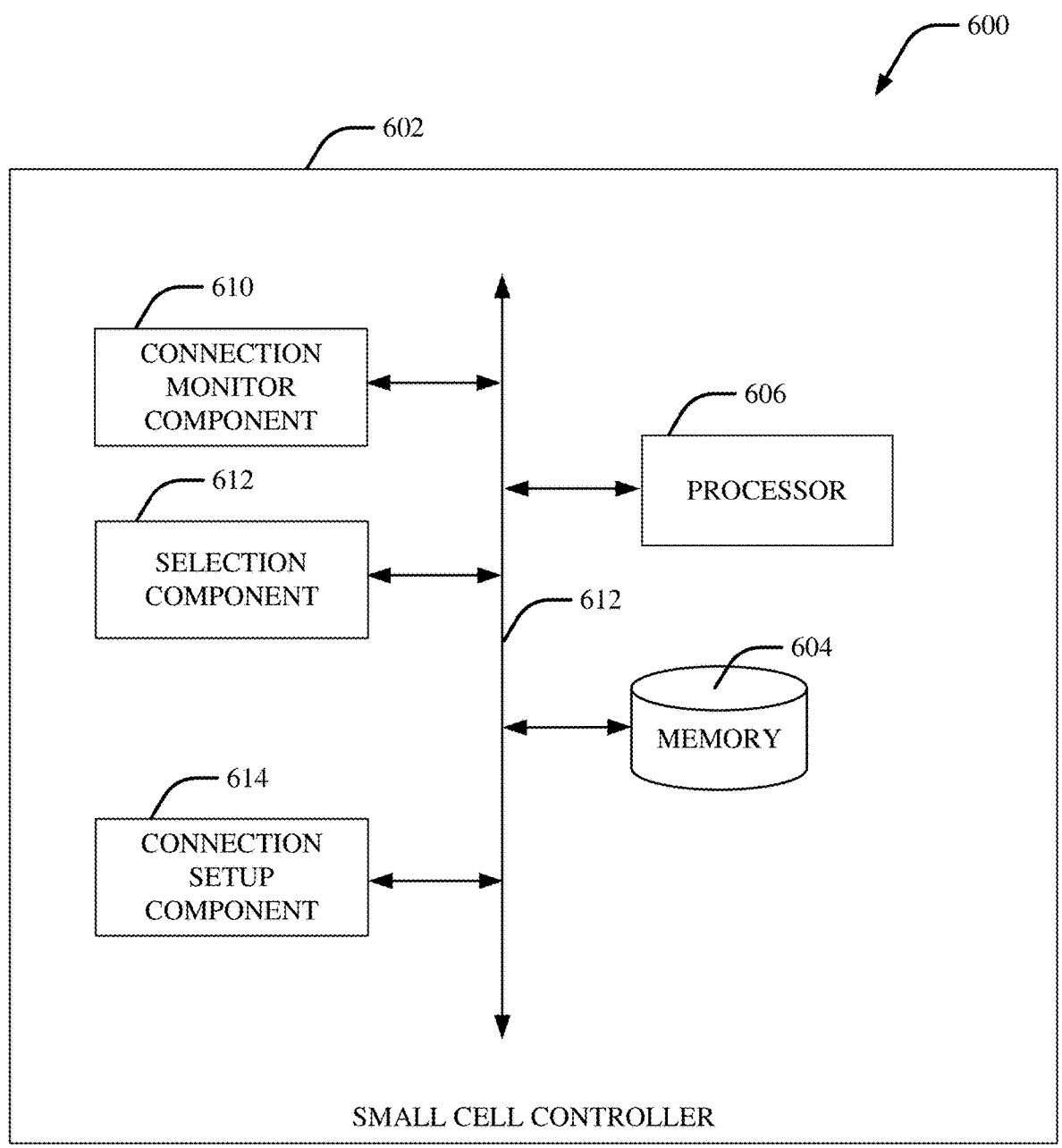
FIG. 6 illustrates a block diagram of an example, non-limiting system that facilitates operation of dynamic self-backhaul system in accordance with one or more embodiments described herein.

FIG. 6 illustrates a block diagram of an example, non-limiting system 600 that facilitates operation of dynamic self-backhaul system in accordance with one or more embodiments described herein. Repetitive description of like elements employed in respective embodiments is omitted for sake of brevity. According to some embodiments, the system 600 can comprise a small cell having a small cell controller 602. In some embodiments, the small cell controller 602 can also include or otherwise be associated with a memory 604, a processor 606 that executes computer executable components stored in a memory 604. The small cell controller 602 can further include a system bus 608 that can couple various components including, but not limited to, a connection monitor component 610, a selection component 612, and a connection setup component 614.

Aspects of systems (e.g., the small cell controller 602 and the like), apparatuses, or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described.

It should be appreciated that the embodiments of the subject disclosure depicted in various figures disclosed herein are for illustration only, and as such, the architecture of such embodiments are not limited to the systems, devices, and/or components depicted therein. For example, in some embodiments, the small cell controller 602 can comprise various computer and/or computing-based elements described herein with reference to operating environment 1300 and FIG. 13. In several embodiments, such computer and/or computing-based elements can be used in connection with implementing one or more of the systems, devices, and/or components shown and described in connection with FIG. 6 or other figures disclosed herein.

According to several embodiments, the memory 604 can store one or more computer and/or machine readable, writable, and/or executable components and/or instructions that, when executed by processor 606, can facilitate performance of operations defined by the executable component(s) and/or instruction(s). For example, the memory 604 can store computer and/or machine readable, writable, and/or executable components and/or instructions that, when executed by the processor 606, can facilitate execution of the various functions described herein relating to the connection monitor component 610, the selection component 612, and the connection setup component 614.

In several embodiments, the memory 604 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 604 are described below with reference to system memory 1306 and FIG. 13. Such examples of memory 604 can be employed to implement any embodiments of the subject disclosure.

According to some embodiments, the memory 604 can maintain RF signal strength information of nearby small cells 304 of the small cell network 400. The memory 604 can also maintain location information of nearby small cells 304 (e.g., small cell 304a can store location and RF signal strength information of small cell 304b and small cell 304c).

According to some embodiments, the processor 606 can comprise one or more types of processors and/or electronic circuitry that can implement one or more computer and/or machine readable, writable, and/or executable components and/or instructions that can be stored on the memory 604. For example, the processor 606 can perform various operations that can be specified by such computer and/or machine readable, writable, and/or executable components and/or instructions including, but not limited to, logic, control, input/output (I/O), arithmetic, and/or the like. In some embodiments, processor 606 can comprise one or more central processing unit, multi-core processor, microprocessor, dual microprocessors, microcontroller, System on a Chip (SOC), array processor, vector processor, and/or another type of processor.

In some embodiments, the processor 606, the memory 604, the connection monitor component 610, the selection component 612, and/or the connection setup component 614 can be communicatively, electrically, and/or operatively coupled to one another via the system bus 608 to perform functions of the small cell controller 602, and/or any components coupled therewith. In several embodiments, the system bus 608 can comprise one or more memory bus, memory controller, peripheral bus, external bus, local bus, and/or another type of bus that can employ various bus architectures.

In several embodiments, the small cell controller 602 can comprise one or more computer and/or machine readable, writable, and/or executable components and/or instructions that, when executed by the processor 606, can facilitate performance of operations defined by such component(s) and/or instruction(s). Further, in numerous embodiments, any component associated with the small cell controller 602, as described herein with or without reference to the various figures of the subject disclosure, can comprise one or more computer and/or machine readable, writable, and/or executable components and/or instructions that, when executed by the processor 606, can facilitate performance of operations defined by such component(s) and/or instruction(s). For example, the connection monitor component 610, and/or any other components associated with the small cell controller 602 (e.g., communicatively, electronically, and/or operatively coupled with and/or employed by small cell controller 602), can comprise such computer and/or machine readable, writable, and/or executable component(s) and/or instruction (s). Consequently, according to numerous embodiments, the small cell controller 602 and/or any components associated therewith, can employ the processor 606 to execute such computer and/or machine readable, writable, and/or executable component(s) and/or instruction(s) to facilitate performance of one or more operations described herein with reference to the small cell controller 602 and/or any such components associated therewith.

In some embodiments, the small cell controller 602 can facilitate performance of operations related to and/or executed by the components of small cell controller 602, for example, the processor 606, the memory 604, the connection monitor component 610, the selection component 612, and the connection setup component 614. For example, as described in detail below, the small cell controller 602 can facilitate: detecting (e.g., by the connection monitor component 610) a failure (e.g., a failure can be due to loss of signal (e.g., packet drops for wireless and wired connection), signal strength below a threshold, or loss of partial or full connection with a node device) in a backhaul communication link between a first node device and a second node device, wherein the second node device is communicatively connected to a core network device of a core network; selecting (e.g., selection component 612) a new node device, other than the first node device and the second node device, that is communicatively connected to the core network device for establishment of a new backhaul communication link to replace the backhaul communication link; and establishing (e.g., by the connection setup component 614) a connection with the new node device to provide a backhaul communication link failure indication to a controller and to request the controller to provide resources to establish the new backhaul communication link with the new node device.

In some embodiments, the connection monitor component 610 monitors both the wire and wireless connections with the macro cell 302 (FIG. 3). In some embodiments, the connection monitor component 610 detects a failure in a backhaul communication link between a first node device and a second node device if there is no data traffic or using various connection monitoring techniques to detect if the connection to macro cell 302 has failed. For example, in some embodiments, when the random-access node cannot communicate with core network because there is no downlink or uplink traffic (e.g., no downlink message/data received or unable to transmit uplink message/data), the monitor component 610 may consider that as the self-backhaul link is down. In some embodiment, the connection monitor component 610 can periodically monitor various connection channels (e.g., a broadcast channel) to determine if the connection to the macro cell 302 is operational. In some embodiments, the connection monitor component 610 detects the backhaul connection failure when data transmission abruptly stops (e.g., the processor no longer can process any data packets) or the macro cell 302 does not respond to any communication requests.

In some embodiments, the selection component 612, can comprise one or more processors, memory, and electrical circuitry. In some embodiments, the selection component 612 can select a second node device, other than the first node device, that is communicatively connected to the core network device for establishment of a second backhaul communication link to replace the first backhaul communication link. The selection component 612 can scan all available cells, both macro cells and multiple small cells within geographical location or within signal range (e.g., RF signal strong enough to communicate data with the cell). The selection component 612 can select the best suited cell to establish the second backhaul communication link (e.g., new backhaul communication link to replace the failed connection). For example, the small cell controller 602 can select either the macro cell or other small cell based on best RF signal strength (e.g., the RF signal strength that can maintain communication with the first node device and the selected node device). Upon identifying the best suited cell, the selection component 612 can confirm that the best suited cell is available for facilitating establishment of a backhaul connection. In some embodiments, the selection component 612 can establish a connection with the best suited cell to confirm availability assist with establishing a new backhaul connection.

In some embodiments, the small cell controller 602 can comprise a connection setup component 614 that can facilitate establishing a first connection with the second node device to provide an indication of the failure of the first backhaul communication link, to provide a confirmation that the second node device is available in connection with establishment of the second backhaul communication link, and to request to reserve resources to establish the second backhaul communication link with the second node device. The connection setup component 614 can setup a new connection with the second node device (e.g., a small cell or macro cell selected based on RF signal strength). Upon selecting the new node to establish a new backhaul connection after a failed connection, the small cell controller can transmit a RRC message, using a minimum bandwidth (e.g., sufficient resources to indicate a connection failure and requesting new resources), to the SDN controller. For example, the minimum bandwidth require can be transmission of message comprising 8 bits (e.g., 1 bit to indicate failure, 2 bits to indicate cell id, 2 bits for macro cell id, 1 bit to request new resources, 2 bits for new cell id) of information. Depending on the size of the cell id (e.g., a system that identifies cell using 4 bits), additional bits may be employed to indicate the connection failed between small cell and macro cell/small cell and to request new resources to establish connection with newly selected node device. In some embodiments, location information of the selected cell (e.g., macro cell or small cell) can be communicated as part of the signal, which may require additional bandwidth. The message is communicated to the macro cell using a wireless connection. The macro cell relays the message to SDN controller 322 indicating the loss of connection and request for resources to establish connection using a different node device. In response to request for resources, the SDN controller 322 can analyze the available resources (e.g., partition the resources) based on network conditions and data analytics to provide appropriate resources. The SDN controller 322 can communicate the new resources the new connection, via the macro cell, to the requesting the small cell controller 602. In response the small cell controller 602 can transmit an acknowledge the receipt. The SDN controller 322 can thereafter update the network graph showing the new backhaul connection (e.g., a new connection with first node device and new node device).

Figure 7:
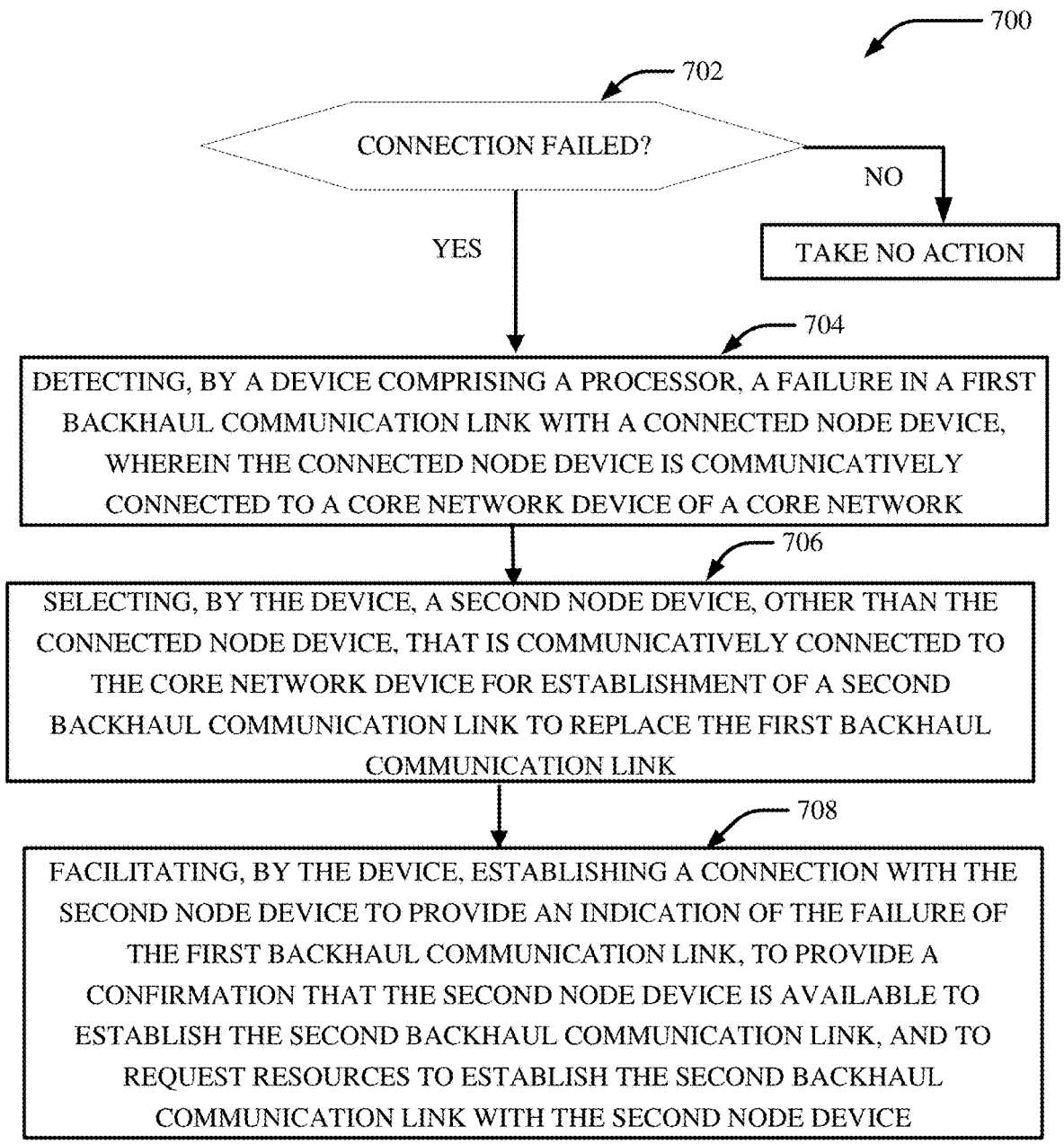
FIG. 7 depicts a diagram of an example, non-limiting computer implemented method that facilitates dynamic self-backhaul system in accordance with one or more embodiments described herein.

FIG. 7 depicts a diagram of an example, non-limiting computer implemented method that facilitates dynamic self-backhaul system in accordance with one or more embodiments described herein. In some examples, flow diagram 700 can be implemented by operating environment 1300 described below. It can be appreciated that the operations of flow diagram 700 can be implemented in a different order than is depicted.

In non-limiting example embodiments, a computing device (or system) (e.g., computer 1302) is provided, the device or system comprising one or more processors and one or more memories that stores executable instructions that, when executed by the one or more processors, can facilitate performance of the operations as described herein, including the non-limiting methods as illustrated in the flow diagrams of FIG. 7.

Operation 702 depicts determining if connection failed (e.g., wired or wireless backhaul connection). If the backhaul connection failed, then perform operation 704. Otherwise, take no action and continue monitoring the connection. Operation 704 depicts detecting, by a device comprising a processor, a failure in a first backhaul communication link with a connected node device, wherein the connected node device is communicatively connected to a core network device of a core network (e.g., detecting failure of the wired or wireless backhaul communication link between the small cell and a macro cell or another small cell connected to macro cell). Operation 706 depicts selecting, by the device, a second node device, other than the connected node device, that is communicatively connected to the core network device for establishment of a second backhaul communication link to replace the first backhaul communication link. Operation 708 depicts facilitating, by the device, establishing a connection with the second node device to provide an indication of the failure of the first backhaul communication link, to provide a confirmation that the second node device is available to establish the second backhaul communication link, and to request resources to establish the second backhaul communication link with the second node device.

Figure 8:
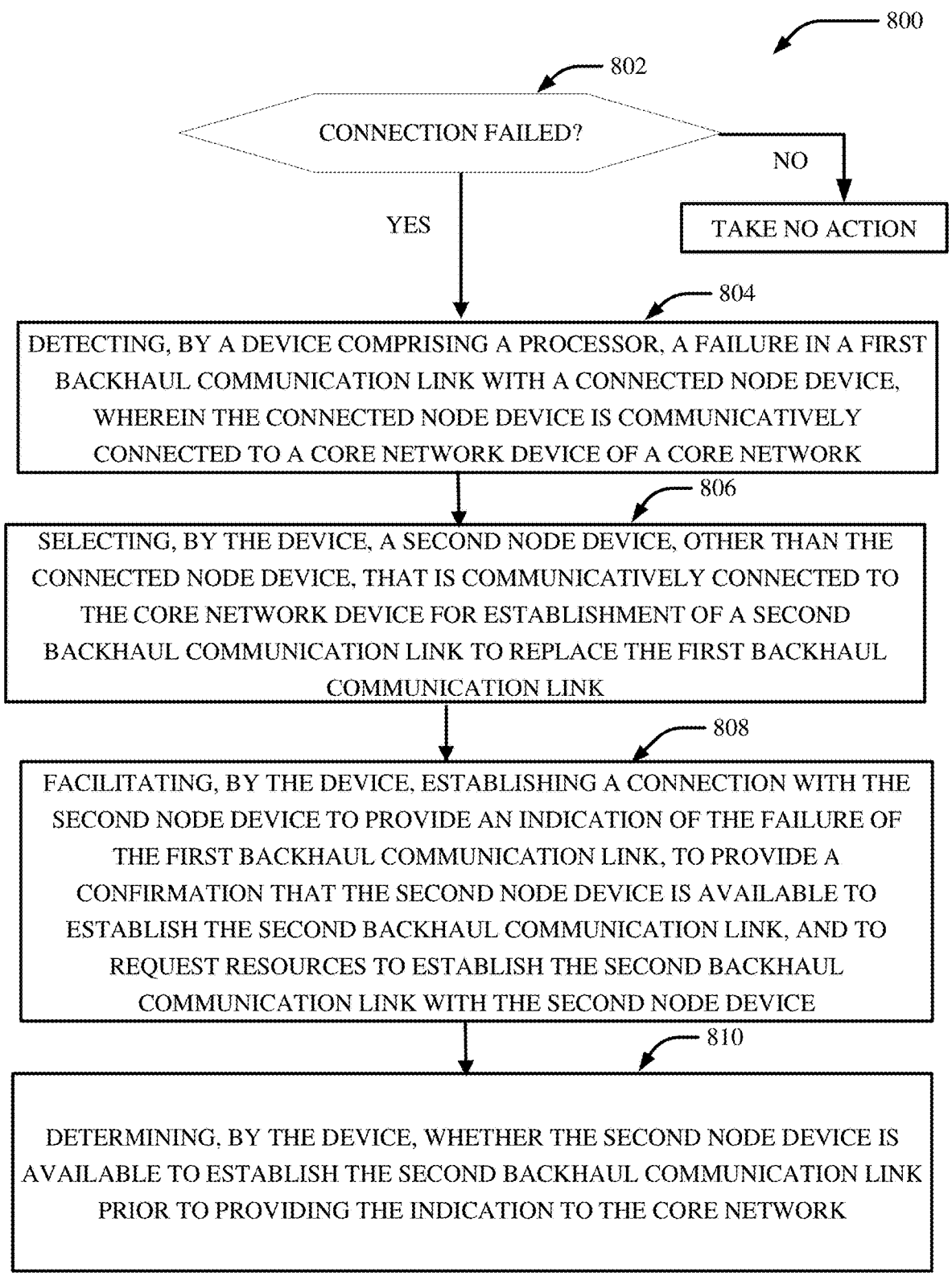
FIG. 8 depicts a diagram of an example, non-limiting computer implemented method that facilitates dynamic self-backhaul system in accordance with one or more embodiments described herein.

FIG. 8 depicts a diagram of an example, non-limiting computer implemented method that facilitates dynamic self-backhaul system in accordance with one or more embodiments described herein. In some examples, flow diagram 800 can be implemented by operating environment 1300 described below. It can be appreciated that the operations of flow diagram 800 can be implemented in a different order than is depicted.

In non-limiting example embodiments, a computing device (or system) (e.g., computer 1302) is provided, the device or system comprising one or more processors and one or more memories that stores executable instructions that, when executed by the one or more processors, can facilitate performance of the operations as described herein, including the non-limiting methods as illustrated in the flow diagrams of FIG. 8.

Operation 802 depicts determining if connection failed (e.g., wired or wireless backhaul connection). If the backhaul connection failed, then perform operation 804. Otherwise, take no action and continue monitoring the connection. Operation 804 depicts detecting, by a device comprising a processor, a failure in a first backhaul communication link with a connected node device, wherein the connected node device is communicatively connected to a core network device of a core network (e.g., detecting failure of the wired or wireless backhaul communication link between the small cell and a macro cell or another small cell connected to macro cell). Operation 806 depicts selecting, by the device, a second node device, other than the connected node device, that is communicatively connected to the core network device for establishment of a second backhaul communication link to replace the first backhaul communication link. Operation 808 depicts facilitating, by the device, establishing a connection with the second node device to provide an indication of the failure of the first backhaul communication link, to provide a confirmation that the second node device is available to establish the second backhaul communication link, and to request resources to establish the second backhaul communication link with the second node device. Operation 810 depicts determining, by the device, whether the second node device is available to establish the second backhaul communication link prior to providing the indication to the core network.

Figure 9:
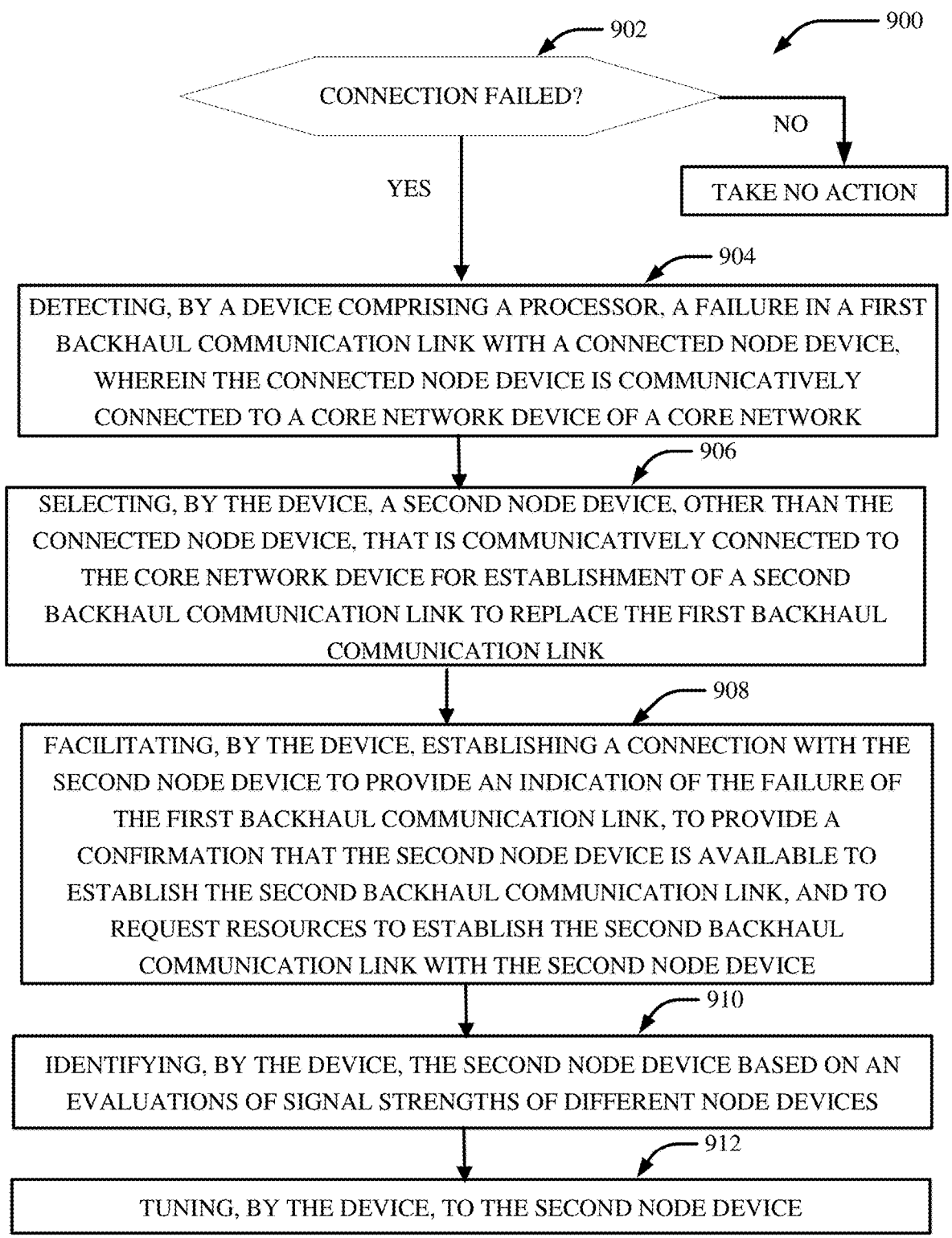
FIG. 9 depicts a diagram of an example, non-limiting computer implemented method that facilitates dynamic self-backhaul system in accordance with one or more embodiments described herein.

FIG. 9 depicts a diagram of an example, non-limiting computer implemented method that facilitates dynamic self-backhaul system in accordance with one or more embodiments described herein. In some examples, flow diagram 900 can be implemented by operating environment 1300 described below. It can be appreciated that the operations of flow diagram 900 can be implemented in a different order than is depicted.

In non-limiting example embodiments, a computing device (or system) (e.g., computer 1302) is provided, the device or system comprising one or more processors and one or more memories that stores executable instructions that, when executed by the one or more processors, can facilitate performance of the operations as described herein, including the non-limiting methods as illustrated in the flow diagrams of FIG. 9.

Operation 902 depicts determining if connection failed (e.g., wired or wireless backhaul connection). If the backhaul connection failed, then perform operation 904. Otherwise, take no action and continue monitoring the connection. Operation 904 depicts detecting, by a device comprising a processor, a failure in a first backhaul communication link with a connected node device, wherein the connected node device is communicatively connected to a core network device of a core network (e.g., detecting failure of the wired or wireless backhaul communication link between the small cell and a macro cell or another small cell connected to macro cell). Operation 906 depicts selecting, by the device, a second node device, other than the connected node device, that is communicatively connected to the core network device for establishment of a second backhaul communication link to replace the first backhaul communication link. Operation 908 depicts facilitating, by the device, establishing a connection with the second node device to provide an indication of the failure of the first backhaul communication link, to provide a confirmation that the second node device is available to establish the second backhaul communication link, and to request resources to establish the second backhaul communication link with the second node device. Operation 910 depicts identifying, by the device, the second node device based on an evaluations of signal strengths of different node devices. Operation 912 depicts tuning, by the device, to the second node device.

Figure 10:
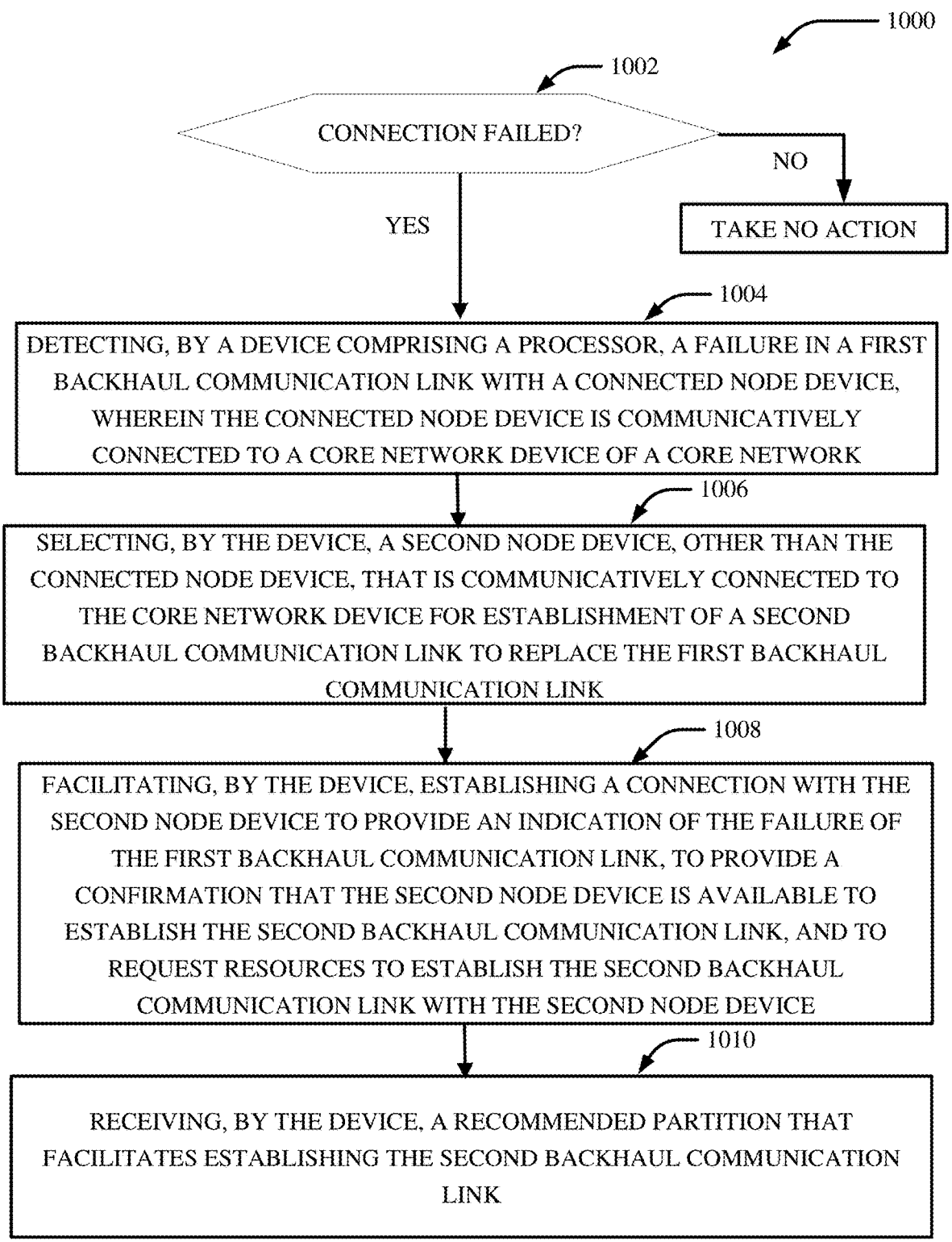
FIG. 10 depicts a diagram of an example, non-limiting computer implemented method that facilitates dynamic self-backhaul system in accordance with one or more embodiments described herein.

FIG. 10 depicts a diagram of an example, non-limiting computer implemented method that facilitates dynamic self-backhaul system in accordance with one or more embodiments described herein. In some examples, flow diagram 1000 can be implemented by operating environment 1300 described below. It can be appreciated that the operations of flow diagram 1000 can be implemented in a different order than is depicted.

In non-limiting example embodiments, a computing device (or system) (e.g., computer 1302) is provided, the device or system comprising one or more processors and one or more memories that stores executable instructions that, when executed by the one or more processors, can facilitate performance of the operations as described herein, including the non-limiting methods as illustrated in the flow diagrams of FIG. 10.

Operation 1002 depicts determining if connection failed (e.g., wired or wireless backhaul connection). If the backhaul connection failed, then perform operation 1004. Otherwise, take no action and continue monitoring the connection. Operation 1004 depicts detecting, by a device comprising a processor, a failure in a first backhaul communication link with a connected node device, wherein the connected node device is communicatively connected to a core network device of a core network (e.g., detecting failure of the wired or wireless backhaul communication link between the small cell and a macro cell or another small cell connected to macro cell). Operation 1006 depicts selecting, by the device, a second node device, other than the connected node device, that is communicatively connected to the core network device for establishment of a second backhaul communication link to replace the first backhaul communication link. Operation 1008 depicts facilitating, by the device, establishing a connection with the second node device to provide an indication of the failure of the first backhaul communication link, to provide a confirmation that the second node device is available to establish the second backhaul communication link, and to request resources to establish the second backhaul communication link with the second node device. Operation 1010 depicts receiving, by the device, a recommended partition that facilitates establishing the second backhaul communication link.

Figure 11:
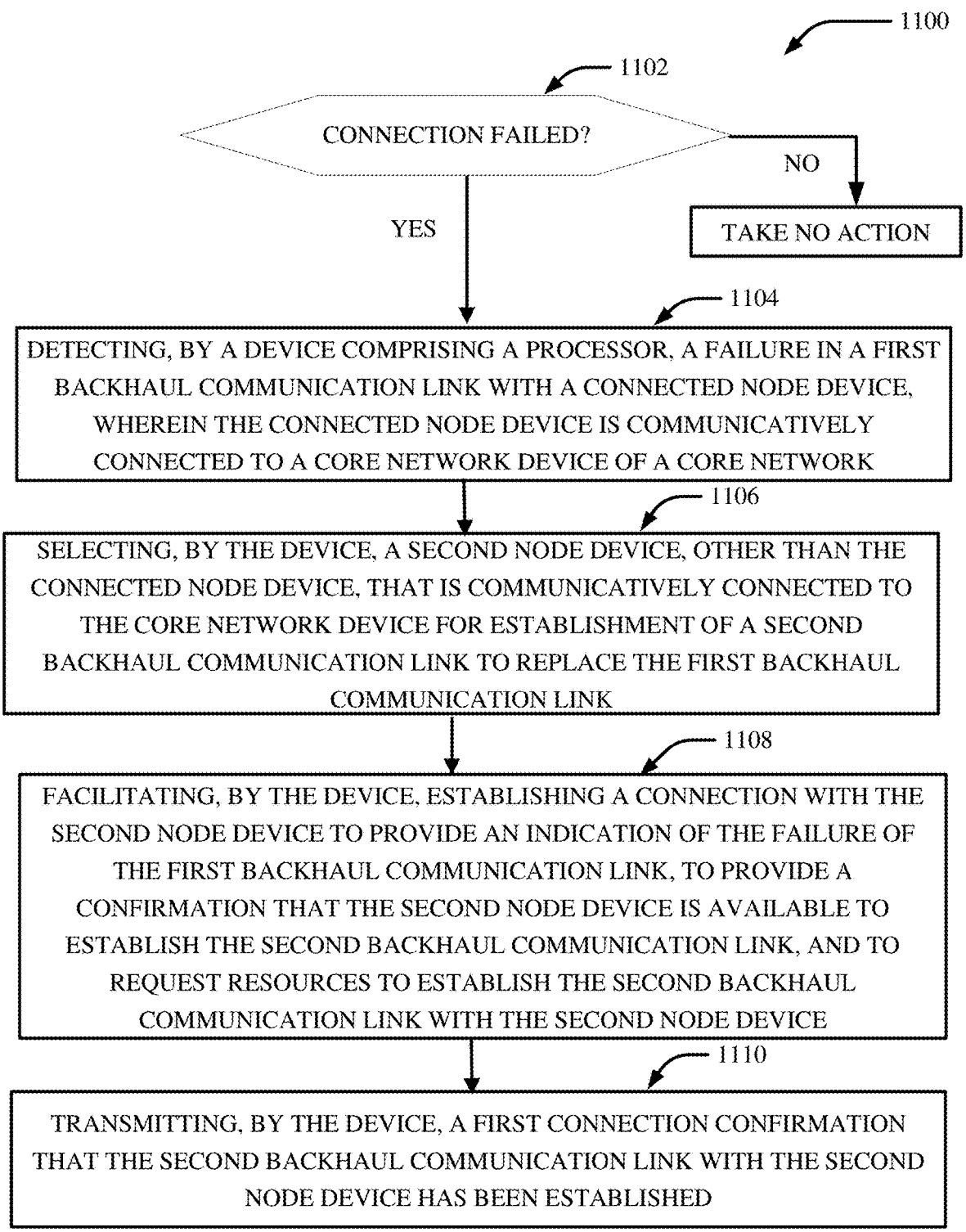
FIG. 11 depicts a diagram of an example, non-limiting computer implemented method that facilitates dynamic self-backhaul system in accordance with one or more embodiments described herein.

FIG. 11 depicts a diagram of an example, non-limiting computer implemented method that facilitates dynamic self-backhaul system in accordance with one or more embodiments described herein. In some examples, flow diagram 1100 can be implemented by operating environment 1300 described below. It can be appreciated that the operations of flow diagram 1100 can be implemented in a different order than is depicted.

In non-limiting example embodiments, a computing device (or system) (e.g., computer 1302) is provided, the device or system comprising one or more processors and one or more memories that stores executable instructions that, when executed by the one or more processors, can facilitate performance of the operations as described herein, including the non-limiting methods as illustrated in the flow diagrams of FIG. 11.

Operation 1102 depicts determining if connection failed (e.g., wired or wireless backhaul connection). If the backhaul connection failed, then perform operation 1104. Otherwise, take no action and continue monitoring the connection. Operation 1104 depicts detecting, by a device comprising a processor, a failure in a first backhaul communication link with a connected node device, wherein the connected node device is communicatively connected to a core network device of a core network (e.g., detecting failure of the wired or wireless backhaul communication link between the small cell and a macro cell or another small cell connected to macro cell). Operation 1106 depicts selecting, by the device, a second node device, other than the connected node device, that is communicatively connected to the core network device for establishment of a second backhaul communication link to replace the first backhaul communication link. Operation 1108 depicts facilitating, by the device, establishing a connection with the second node device to provide an indication of the failure of the first backhaul communication link, to provide a confirmation that the second node device is available to establish the second backhaul communication link, and to request resources to establish the second backhaul communication link with the second node device. Operation 1110 depicts transmitting, by the device, a first connection confirmation that the second backhaul communication link with the second node device has been established.

Figure 12:
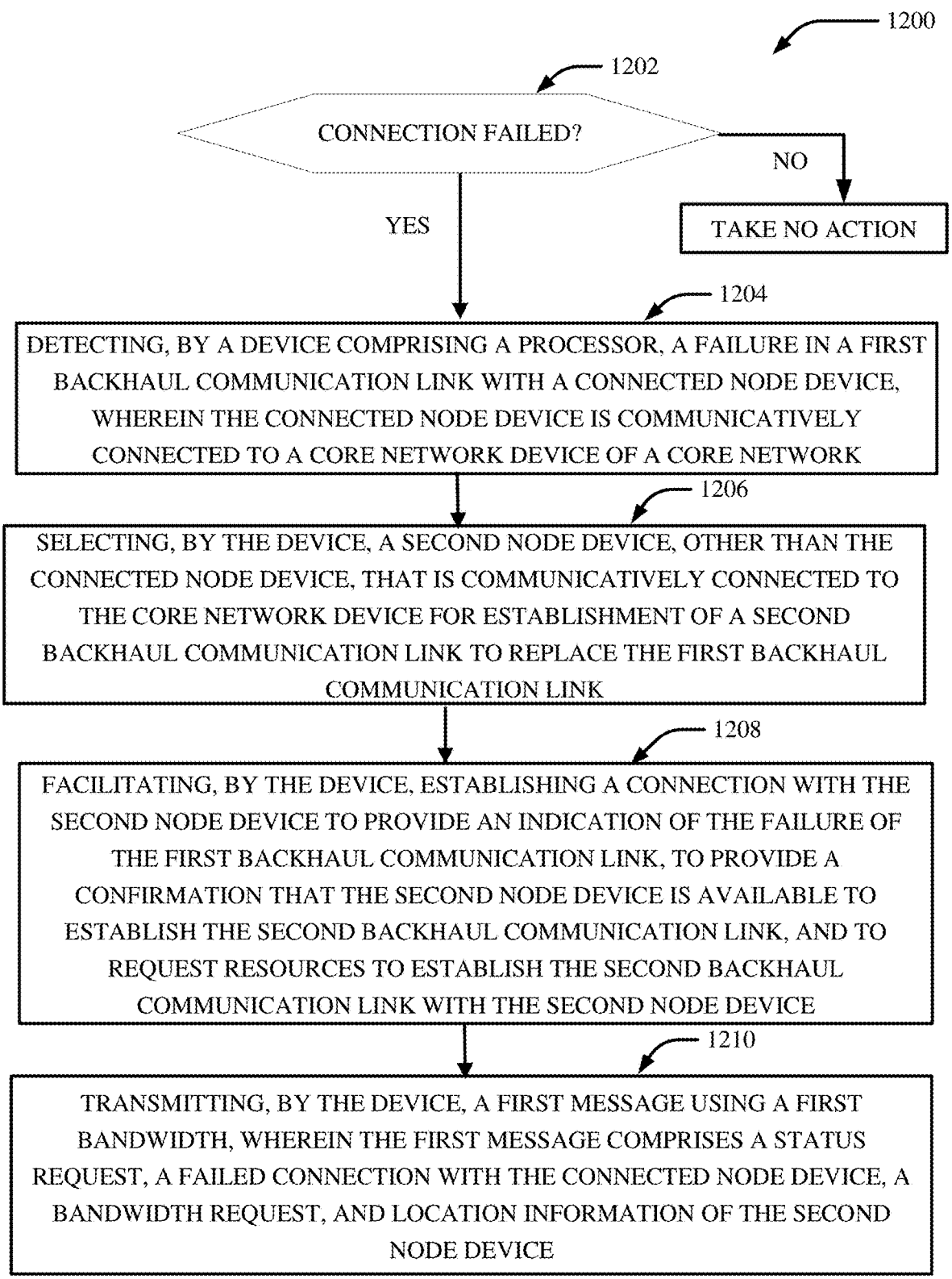
FIG. 12 depicts a diagram of an example, non-limiting computer implemented method that facilitates dynamic self-backhaul system in accordance with one or more embodiments described herein.

FIG. 12 depicts a diagram of an example, non-limiting computer implemented method that facilitates dynamic self-backhaul system in accordance with one or more embodiments described herein. In some examples, flow diagram 1200 can be implemented by operating environment 1300 described below. It can be appreciated that the operations of flow diagram 1200 can be implemented in a different order than is depicted.

In non-limiting example embodiments, a computing device (or system) (e.g., computer 1302) is provided, the device or system comprising one or more processors and one or more memories that stores executable instructions that, when executed by the one or more processors, can facilitate performance of the operations as described herein, including the non-limiting methods as illustrated in the flow diagrams of FIG. 12.

Operation 1202 depicts determining if connection failed (e.g., wired or wireless backhaul connection). If the backhaul connection failed, then perform operation 1204. Otherwise, take no action and continue monitoring the connection. Operation 1204 depicts detecting, by a device comprising a processor, a failure in a first backhaul communication link with a connected node device, wherein the connected node device is communicatively connected to a core network device of a core network (e.g., detecting failure of the wired or wireless backhaul communication link between the small cell and a macro cell or another small cell connected to macro cell). Operation 1206 depicts selecting, by the device, a second node device, other than the connected node device, that is communicatively connected to the core network device for establishment of a second backhaul communication link to replace the first backhaul communication link. Operation 1208 depicts facilitating, by the device, establishing a connection with the second node device to provide an indication of the failure of the first backhaul communication link, to provide a confirmation that the second node device is available to establish the second backhaul communication link, and to request resources to establish the second backhaul communication link with the second node device. Operation 1210 depicts transmitting, by the device, a first message using a first bandwidth, wherein the first message comprises a status request, a failed connection with the connected node device, a bandwidth request, and location information of the second node device.

Figure 13:
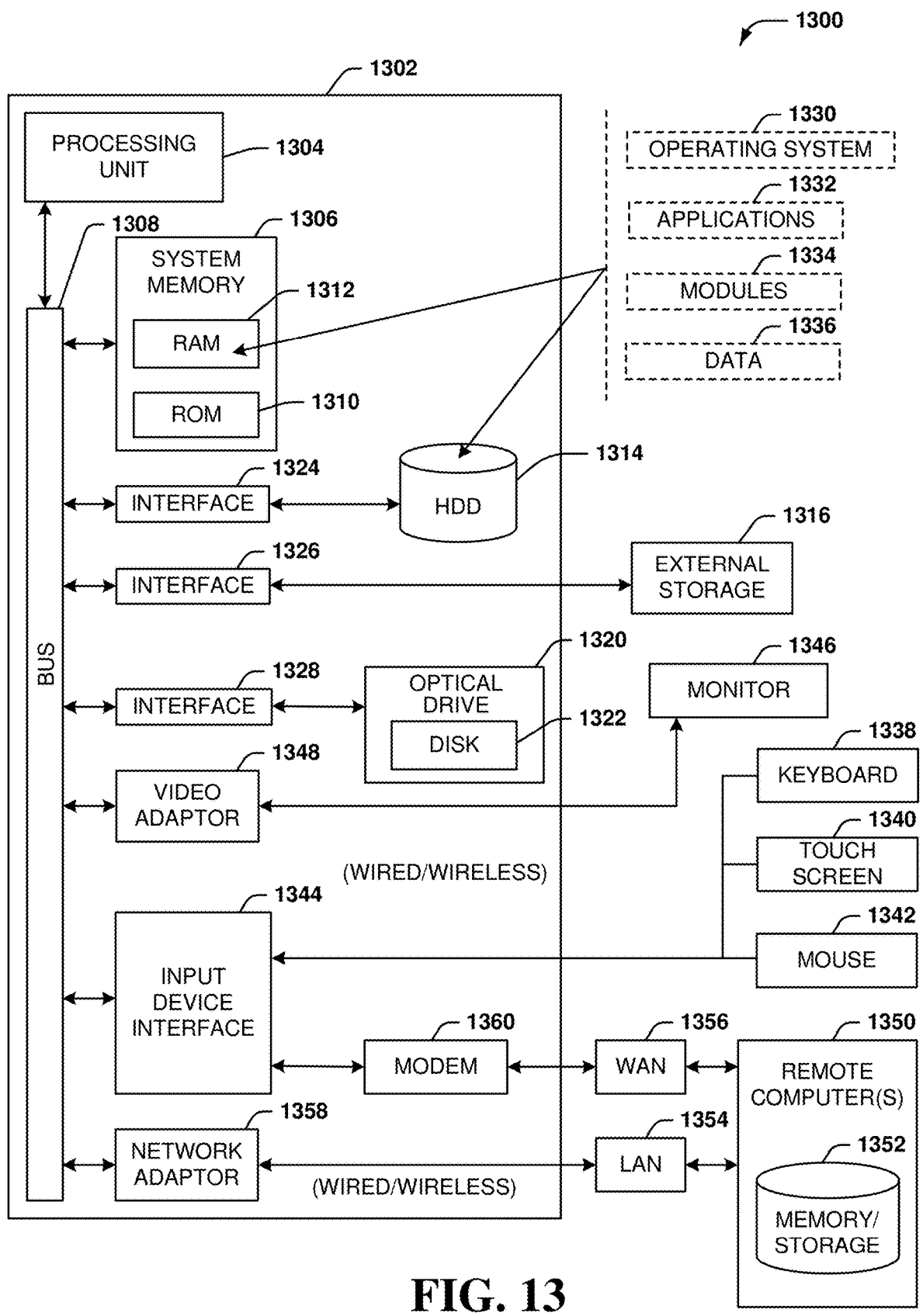
FIG. 13 illustrates an example block diagram of an example computer operable to engage in a system architecture that facilitates secure wireless communication according to one or more embodiments described herein.

Referring now to FIG. 13, illustrated is an example block diagram of an example computer 1300 operable to engage in a system architecture that facilitates wireless communications according to one or more embodiments described herein. The computer 1300 can provide networking and communication capabilities between a wired or wireless communication network and a server and/or communication device.

In order to provide additional context for various embodiments described herein, FIG. 13 and the following discussion are intended to provide a brief, general description of a suitable computing environment 1300 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the novel methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 13, the example environment 1300 for implementing various embodiments of the aspects described herein includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi-processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes ROM 1310 and RAM 1312. A basic input/output system (BIOS) can be stored in a non-volatile memory such as ROM, erasable programmable read only memory (EPROM), EEPROM, which BIOS contains the basic routines that help to transfer information between elements within the computer 1302, such as during startup. The RAM 1312 can also include a high-speed RAM such as static RAM for caching data.

The computer 1302 further includes an internal hard disk drive (HDD) 1314 (e.g., EIDE, SATA), one or more external storage devices 1316 (e.g., a magnetic floppy disk drive (FDD) 1316, a memory stick or flash drive reader, a memory card reader, etc.) and an optical disk drive 1320 (e.g., which can read or write from a CD-ROM disc, a DVD, a BD, etc.). While the internal HDD 1314 is illustrated as located within the computer 1302, the internal HDD 1314 can also be configured for external use in a suitable chassis (not shown). Additionally, while not shown in environment 1300, a solid state drive (SSD) could be used in addition to, or in place of, an HDD 1314. The HDD 1314, external storage device(s) 1316 and optical disk drive 1320 can be connected to the system bus 1308 by an HDD interface 1324, an external storage interface 1326 and an optical drive interface 1328, respectively. The interface 1324 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1302, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. The systems and methods described herein can be implemented utilizing various commercially available operating systems or combinations of operating systems.

Computer 1302 can optionally comprise emulation technologies. For example, a hypervisor (not shown) or other intermediary can emulate a hardware environment for operating system 1330, and the emulated hardware can optionally be different from the hardware illustrated in FIG. 13. In such an embodiment, operating system 1330 can comprise one virtual machine (VM) of multiple VMs hosted at computer 1302. Furthermore, operating system 1330 can provide runtime environments, such as the Java runtime environment or the .NET framework, for applications 1332. Runtime environments are consistent execution environments that allow applications 1332 to run on any operating system that includes the runtime environment. Similarly, operating system 1330 can support containers, and applications 1332 can be in the form of containers, which are lightweight, standalone, executable packages of software that include, e.g., code, runtime, system tools, system libraries and settings for an application.

Further, computer 1302 can be enable with a security module, such as a trusted processing module (TPM). For instance with a TPM, boot components hash next in time boot components, and wait for a match of results to secured values, before loading a next boot component. This process can take place at any layer in the code execution stack of computer 1302, e.g., applied at the application execution level or at the operating system (OS) kernel level, thereby enabling security at any level of code execution.

A user can enter commands and information into the computer 1302 through one or more wired/wireless input devices, e.g., a keyboard 1338, a touch screen 1340, and a pointing device, such as a mouse 1342. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1304 through an input device interface 1344 that can be coupled to the system bus 1308, but can be connected by other interfaces, such as a parallel port, an IEEE 1394 serial port, a game port, a USB port, an IR interface, a BLUETOOTH® interface, etc.

A monitor 1346 or other type of display device can be also connected to the system bus 1308 via an interface, such as a video adapter 1348. In addition to the monitor 1346, a computer typically includes other peripheral output devices (not shown), such as speakers, printers, etc.

The computer 1302 can operate in a networked environment using logical connections via wired and/or wireless communications to one or more remote computers, such as a remote computer(s) 1350. The remote computer(s) 1350 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1352 is illustrated. The logical connections depicted include wired/wireless connectivity to a local area network (LAN) 1354 and/or larger networks, e.g., a wide area network (WAN) 1356. Such LAN and WAN networking environments are commonplace in offices and companies, and facilitate enterprise-wide computer networks, such as intranets, all of which can connect to a global communications network, e.g., the Internet.

When used in a LAN networking environment, the computer 1302 can be connected to the local network 1354 through a wired and/or wireless communication network interface or adapter 1358. The adapter 1358 can facilitate wired or wireless communication to the LAN 1354, which can also include a wireless access point (AP) disposed thereon for communicating with the adapter 1358 in a wireless mode.

When used in a WAN networking environment, the computer 1302 can include a modem 1360 or can be connected to a communications server on the WAN 1356 via other means for establishing communications over the WAN 1356, such as by way of the Internet. The modem 1360, which can be internal or external and a wired or wireless device, can be connected to the system bus 1308 via the input device interface 1344. In a networked environment, program modules depicted relative to the computer 1302 or portions thereof, can be stored in the remote memory/storage device 1352. It will be appreciated that the network connections shown are example and other means of establishing a communications link between the computers can be used.

When used in either a LAN or WAN networking environment, the computer 1302 can access cloud storage systems or other network-based storage systems in addition to, or in place of, external storage devices 1316 as described above. Generally, a connection between the computer 1302 and a cloud storage system can be established over a LAN 1354 or WAN 1356 e.g., by the adapter 1358 or modem 1360, respectively. Upon connecting the computer 1302 to an associated cloud storage system, the external storage interface 1326 can, with the aid of the adapter 1358 and/or modem 1360, manage storage provided by the cloud storage system as it would other types of external storage. For instance, the external storage interface 1326 can be configured to provide access to cloud storage sources as if those sources were physically connected to the computer 1302.

The computer 1302 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine-readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "NodeB," "evolved Node B (eNodeB)," "home Node B (HNB)," "home access point (HAP)," "cell device," "sector," "cell," "relay device," "node," "point," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third-party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used, or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be affected across a plurality of devices. Accordingly, the invention is not to be limited to any single implementation, but rather is to be construed in breadth, spirit and scope in accordance with the appended claims.

What is claimed is:

1. A system, comprising:
    a processor; and
    a memory that stores executable instructions that, when executed by the processor, facilitate performance of operations, comprising:
        detecting a failure in a first communication link with first node equipment, wherein the first node equipment is communicatively connected to network equipment;
        selecting second node equipment, other than the first node equipment, that is communicatively connected to the core network equipment, for establishment of a second communication link to replace the first communication link; and
        facilitating establishing a first connection with the second node equipment to:
            provide an indication of the failure of the first communication link,
            provide a confirmation that the second node equipment is available in connection with establishment of the second communication link, and
            request to reserve resources to establish the second communication link with the second node equipment.

2. The system of claim 1, wherein the operations further comprise:
    determining whether the second node equipment is available to establish the second communication link prior to providing the indication to the network; and
    in response to the determining that the second node equipment is available to establish the second communication link, transmitting a first message using a first bandwidth, wherein the first message comprises a status request, a status update, a bandwidth request, and location information of the second node equipment.

3. The system of claim 2, wherein selecting the second node equipment comprises identifying the second node equipment based on an evaluation of signal strengths of different node equipment and tuning to the second node equipment.

4. The system of claim 1, wherein facilitating the establishing of the first connection comprises facilitating the establishing of a wireless connection employing a first bandwidth that carries signaling information.

5. The system of claim 1, wherein the operations further comprise:
    receiving a recommended partition that facilitates establishing the second communication link with the second node equipment; and
    establishing the second communication link utilizing the recommended partition.

6. The system of claim 1, wherein the operations further comprise:
    transmitting a confirmation of establishment of the second communication link with the second node equipment.

7. The system of claim 1, wherein the first communication link comprises a first backhaul communication link, wherein the network equipment is core network equipment, and wherein the operations further comprise:
    transmitting a self-backhaul request message comprising:
        a status request,
        a self-backhaul status update message comprising an indication of the failure in the first communication link,
        a self-backhaul bandwidth request message comprising a request for bandwidth, and
        a self-backhaul location request message comprising location information of the second node equipment.

8. A method, comprising:
    detecting, by equipment comprising a processor, a failure in a first communication link with first node equipment communicatively connected to network equipment;

selecting, by the equipment, second node equipment, different than the first node equipment, that is communicatively connected to the network equipment for establishment of a second communication link to replace the first communication link; and facilitating, by the equipment, establishing a connection with the second node equipment to provide an indication of the failure of the first communication link, to provide a confirmation that the second node equipment is available to establish the second communication link, and to request resources to establish the second communication link with the second node equipment.

9. The method of claim 8, further comprising:

determining, by the equipment, whether the second node equipment is available to establish the second communication link prior to providing the indication.

10. The method of claim 8, further comprising;

identifying, by the equipment, the second node equipment based on an evaluation of signal strengths of different node equipment; and tuning, by the equipment, to the second node equipment.

11. The method of claim 8, wherein facilitating the establishing of the connection comprises facilitating the establishing a wireless connection employing a first bandwidth that carries signaling information.

12. The method of claim 8, further comprising:

receiving, by the equipment, a recommended partition that facilitates establishing the second communication link.

13. The method of claim 8, further comprising:

transmitting, by the equipment, a first connection confirmation that the second communication link with the second node equipment has been established.

14. The method of claim 8, further comprising:

transmitting, by the equipment, a first message using a first bandwidth, wherein the first message comprises a status request, a failed connection with the connected node equipment, a bandwidth request, and location information of the second node equipment.

15. A non-transitory machine-readable medium, comprising executable instructions that, when executed by a processor, facilitate performance of operations, comprising:

detecting a failure in a first communication link with connected node equipment, wherein the connected node equipment is communicatively connected to a network equipment;

selecting a donor node equipment, other than the connected node equipment, that is communicatively connected to the network equipment for establishment of a second communication link to replace the first communication link; and facilitating establishing a connection with the donor equipment to provide an indication of the failure of the first communication link, to provide a confirmation that the donor node equipment is available to establish the second communication link, and to request resources to establish the second communication link with the donor node equipment.

16. The non-transitory machine-readable medium of claim 15, wherein the operations further comprise:

determining whether the donor node equipment is available to establish the second communication link prior to providing the indication.

17. The non-transitory machine-readable medium of claim 15, wherein the operations further comprise:

identifying the donor node equipment based on an evaluation of signal strengths of different node equipment; and tuning to the donor node equipment.

18. The non-transitory machine-readable medium of claim 15, wherein the operations further comprise:

receiving a recommended partition that facilitates establishing the second communication link.

19. The non-transitory machine-readable medium of claim 15, wherein the operations further comprise:

receiving a recommended partition that facilitates establishing the second communication link with the donor node equipment;

establishing the second communication link utilizing the recommended partition; and transmitting a first message indicating that the second communication link with the donor node equipment has been established.

20. The non-transitory machine-readable medium of claim 15, wherein the first communication link comprises a first communication link, wherein the network equipment comprises core network equipment, and wherein the operations further comprise:

transmitting a first self-backhaul request message comprising a status request, a second self-backhaul status update message comprising an indication of the failure in first communication link, a third self-backhaul bandwidth request message comprising a request for bandwidth and a fourth self-backhaul location request message comprising location information of the second node equipment.

* * * * *